United States Patent
Shi et al.

(10) Patent No.: US 9,712,792 B2
(45) Date of Patent: Jul. 18, 2017

(54) RGB-RWB DUAL IMAGES BY MULTI-LAYER SENSORS TOWARDS BETTER IMAGE QUALITY

(71) Applicants: Lilong Shi, Pasadena, CA (US); Ilia Ovsiannikov, Studio City, CA (US)

(72) Inventors: Lilong Shi, Pasadena, CA (US); Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/924,704

(22) Filed: Oct. 27, 2015

(65) Prior Publication Data
US 2017/0048500 A1    Feb. 16, 2017

Related U.S. Application Data

(60) Provisional application No. 62/203,390, filed on Aug. 10, 2015.

(51) Int. Cl.
*H04N 9/04* (2006.01)
*H04N 5/225* (2006.01)
*H04N 9/64* (2006.01)

(52) U.S. Cl.
CPC ............ *H04N 9/045* (2013.01); *H04N 9/646* (2013.01); *H04N 2209/045* (2013.01); *H04N 2209/046* (2013.01); *H04N 2209/047* (2013.01)

(58) Field of Classification Search
CPC ...... H04N 9/045; H04N 9/646; H04N 5/2254; H04N 5/2253
See application file for complete search history.

(56) References Cited

U.S. PATENT DOCUMENTS 7,129,466 B2 * 10/2006 Iwasaki ................. H01L 27/302
250/208.1
8,314,863 B2    11/2012 Tachi
(Continued)

OTHER PUBLICATIONS

Ihama, Mikio, et al., "Proposal of New Organic CMOS Image Sensor for Reduction in Pixel Size," Fujifilm Research & Development (No. 55-2010), pp. 14-17.
(Continued)

*Primary Examiner* — Padma Haliyur
(74) *Attorney, Agent, or Firm* — Renaissance IP Law Group LLP

(57) ABSTRACT

Using improved Image Signal Processing (ISP) along with a multi-layer Color Filter Array (CFA) architecture to capture both the Red-Green-Blue (RGB) as well as the Red-X-Blue (RXB) images substantially simultaneously on the same Complementary Metal Oxide Semiconductor (CMOS) image sensor chip in a single shot so that subsequent image processing stage(s) can choose between RGB and RXB images to improve the quality of the final image. The color "X" in the RXB image may be a white color, a yellow color, or a cyan color. In contrast to the individual RWB or RGB imaging based conventional CMOS sensors, the disclosed CMOS sensor with one or more layers of specifically-selected CFAs can capture both the RGB and RXB images in a single shot using associated ISP. The multi-layer sensor may be an organic sensor or a stacked X3 sensor. The dual RGB-RXB imaging may reduce colorblindness, chromatic aberration, and saturation artifacts.

20 Claims, 8 Drawing Sheets

(56) References Cited

U.S. PATENT DOCUMENTS

2013/0242148 A1 9/2013 Mlinar et al.
2015/0116545 A1 4/2015 Ovsiannikov et al.

OTHER PUBLICATIONS

Lim, Seon-Jeong et al., "Organic-on-silicon complementary metal-oxide-semiconductor colour image sensors," Scientific Reports, www.nature.com/scientificreports, 5:7708 | DOI: 10.1038/srep07708, published Jan. 12, 2015, pp. 1-7.

* cited by examiner

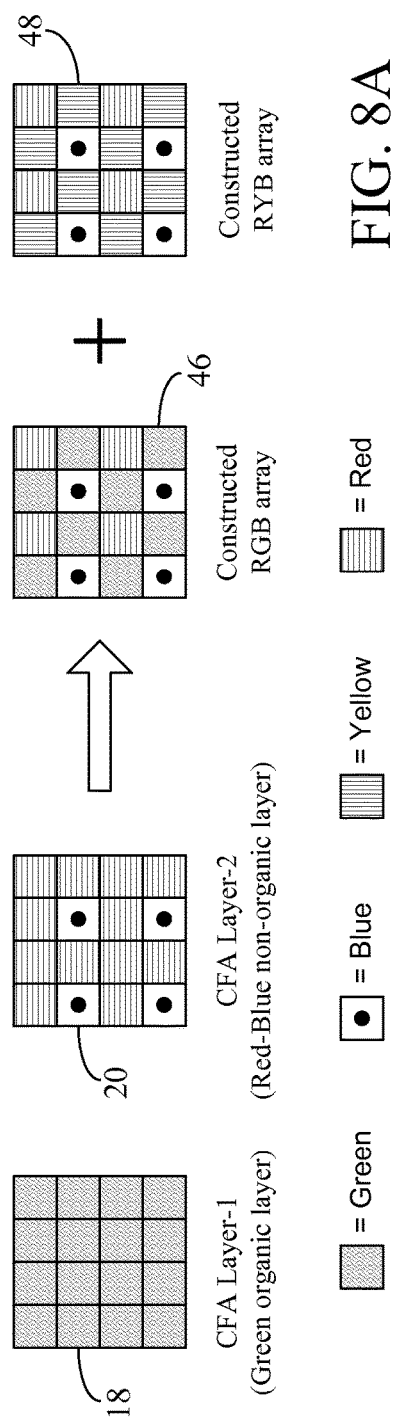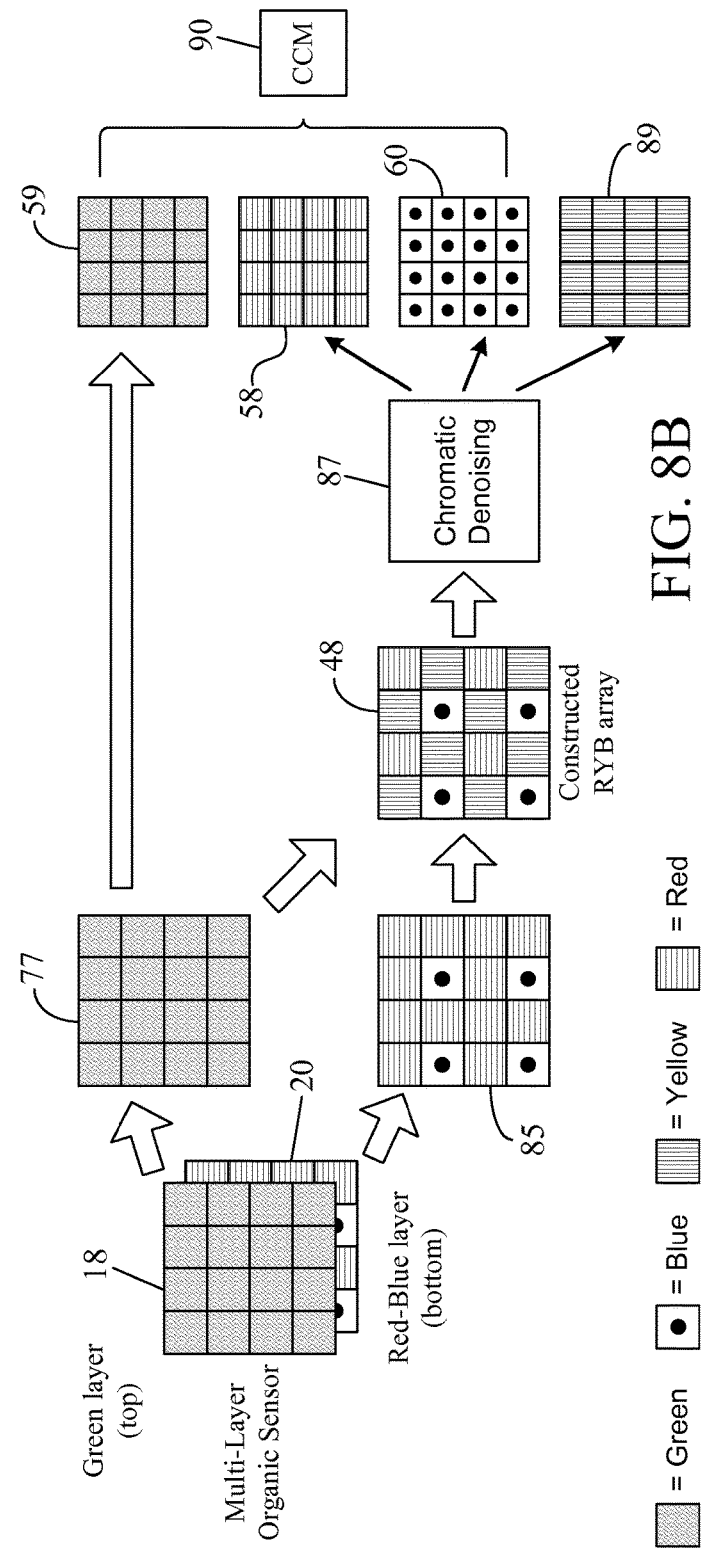

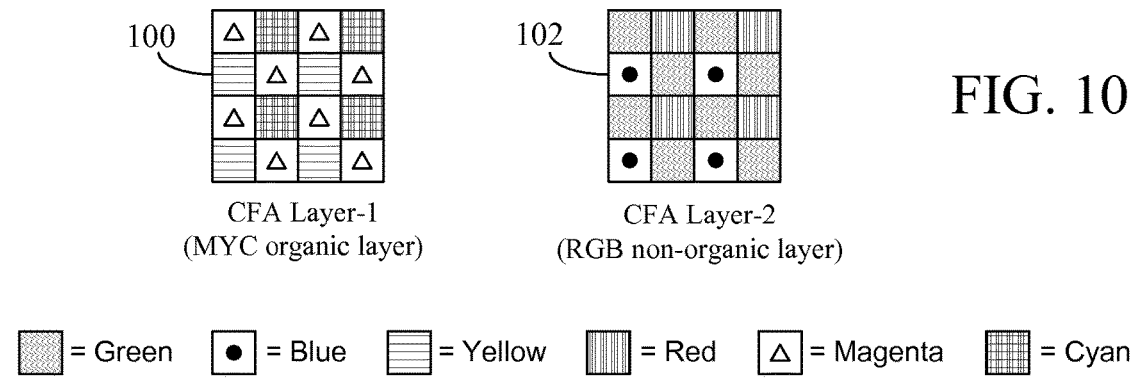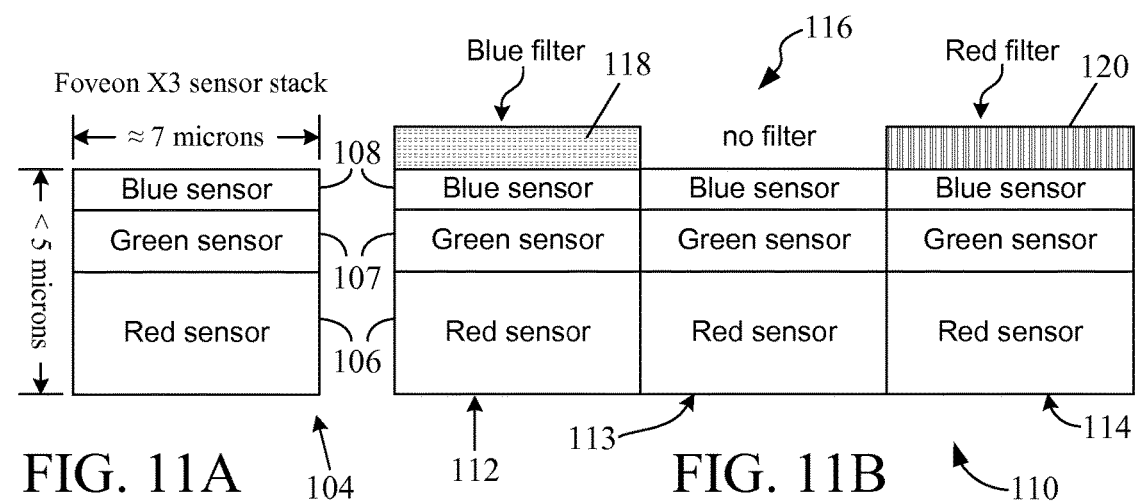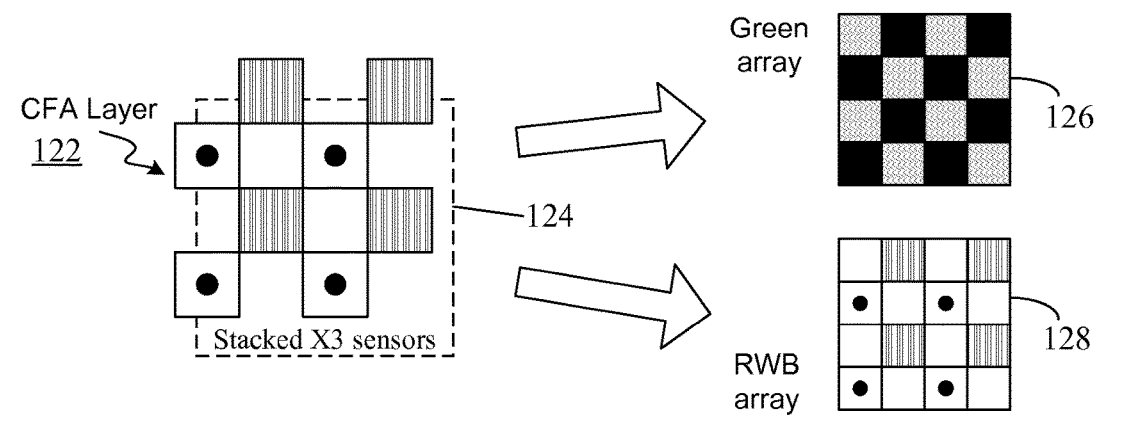

RGB-RWB DUAL IMAGES BY MULTI-LAYER SENSORS TOWARDS BETTER IMAGE QUALITY

CROSS-REFERENCE TO RELATED APPLICATIONS

This application claims the priority benefit under 35 U.S.C. §119(e) of U.S. Provisional Application No. 62/203,390 filed on Aug. 10, 2015, the disclosure of which is incorporated herein by reference in its entirety.

TECHNICAL FIELD

The present disclosure generally relates to image sensors. More specifically, and not by way of limitation, particular embodiments of the inventive aspects disclosed in the present disclosure are directed to a multi-layer Complementary Metal Oxide Semiconductor (CMOS) image sensor where Red-Green-Blue (RGB) and Red-White-Blue (RWB) images having Bayer patterns are generated on the same chip substantially simultaneously during a single shot to allow choice of RGB or RWB image during subsequent image processing operations such as, for example, color correction, noise reduction, reduction of chromatic aberration, and reduction of colorblindness.

BACKGROUND

In commercial mobile products such as, for example, cell phones, CMOS RWB imaging sensor has been recently introduced as the image sensor for the cell phone's camera. The RWB sensor includes a Color Filter Array (CFA) of red, white, and blue color filters arranged in a Bayer color pattern. The CMOS RWB sensor has been known to produce better image quality in low light environment with lower noise compared to the conventional CMOS RGB sensor counterpart. In construction, the CMOS RWB sensor differs from the traditional Bayer pattern-based CMOS RGB sensor in that the green filter in the RGB CFA is replaced with a white (or clear) filter in the RWB CFA. As a result, the RWB sensor allows more photons to reach the photon-sensitive sites (also referred to as "photo-sites"), which, in turn, increases the sensor's Signal-to-Noise Ratio (SNR). On the other hand, due to the broadband (or panchromatic) spectral response of the white filter, the associated Color Correction Matrix (CCM)—which is commonly used to convert colors from the camera color space to a standard color space such as, for example, the Standard RGB (sRGB) color space—has large off-diagonal entries. These large entries lead to a vast amplification of noise during the color correction phase in the image processing pipeline in the CMOS RWB sensor. As a consequence, the increased Luminance SNR (YSNR) in the raw RWB image—because of more photons collected by the photo-sites—diminishes and the noise becomes higher than that in the corresponding traditional RGB image. This is the main reason why RWB sensor was not previously vastly adapted in commercial products.

However, recent developments in Image Signal Processing (ISP) have addressed this noise amplification issue and, as a result, now the YSNR of an RWB sensor can be raised to a decent level. For example, the Clarity+ ISP application developed by Aptina Imaging Corporation of San Jose, Calif., USA (now part of ON Semiconductor of Phoenix, Ariz., USA) can achieve +3 dB of YSNR increase for an RWB sensor under low light. This ISP application correlates the noise in the three color channels—R, W, and B. Thus, when the image is converted to the standard color space by the CCM of the RWB sensor, the noise will not be amplified as much. As a result, the final image by the RWB sensor has less noise than that by the comparable RGB sensor.

Moreover, current RWB sensors may suffer from colorblindness and chromatic aberration artifacts. Colorblindness arises because an RWB sensor can be "blind" to certain color edges which an RGB sensor has no problem distinguishing. On the other hand, chromatic aberration arises because red, green, and blue lights have different diffraction ratios and, hence, they may focus in front of/back to the image plane, or at different locations even if they all focus on the image plane. Chromatic aberration may be present, especially in the absence of a sophisticatedly-designed lens to completely eliminate such aberration. When chromatic aberration occurs, the white light signal—containing the red, green, and blue components—will be blurry because of the mixing of lights at different focus points. On the other hand, the traditional RGB sensor has lower chromatic aberration than the RWB sensor.

SUMMARY

In one embodiment, the present disclosure is directed to a method that comprises: (i) providing a multi-layer image sensor having a plurality of pixels arranged in a pixel array and further having at least one layer of Color Filer Array (CFA) overlaid on the pixel array such that at least one location-specific color filter is associated with each pixel location in the pixel array; (ii) collecting one or more color signals from each pixel location in the pixel array during a single imaging operation, wherein each color signal associated with a given pixel location represents a different color of light; and (iii) selectively combining color signals from each pixel location to construct the following color patterns, each color pattern having colors arranged in one-to-one correspondence with each pixel location in the pixel array: (a) a Red-Green-Blue (RGB) color pattern, and (b) an RXB color pattern, wherein "X" represents one of the following colors: white, yellow, or cyan.

In another embodiment, the present disclosure is directed to an image sensor unit that comprises: (i) a plurality of pixels arranged in a pixel array; (ii) at least one layer of CFA overlaid on the pixel array such that at least one location-specific color filter is associated with each pixel location in the pixel array; and (iii) a processing unit coupled to the pixel array. In the image sensor unit, the processing unit is operable to perform the following: (a) collect one or more color signals from each pixel location in the pixel array during a single imaging operation, wherein each color signal associated with a given pixel location represents a different color of light; and (b) combine color signals from each pixel location as needed to construct the following color patterns, each color pattern having colors arranged in one-to-one correspondence with each pixel location in the pixel array: an RGB color pattern, and an RXB color pattern, wherein "X" represents one of the following colors: white, yellow, or cyan.

In a further embodiment, the present disclosure is directed to a system, which comprises: (i) an image sensor unit; (ii) a memory for storing program instructions; and (iii) a processor coupled to the image sensor unit and the memory. In the system the image sensor unit includes: (a) a plurality of pixels arranged in a pixel array; and (b) at least one layer of CFA overlaid on the pixel array such that at least one location-specific color filter is associated with each pixel location in the pixel array. In the system, the processor is configured to execute the program instructions, whereby the processor is operative to perform the following: (a) collect one or more color signals from each pixel location in the pixel array during a single imaging operation, wherein each color signal associated with a given pixel location represents a different color of light; and (b) selectively combine color signals from each pixel location to construct the following color patterns, each color pattern having colors arranged in one-to-one correspondence with each pixel location in the pixel array: an RGB color pattern, and an RXB color pattern, wherein "X" represents one of the following colors: white, yellow, or cyan.

BRIEF DESCRIPTION OF THE DRAWINGS

In the following section, the inventive aspects of the present disclosure will be described with reference to exemplary embodiments illustrated in the figures, in which:

FIGS. 8A-8B provide an exemplary illustration of how an RGB-RYB (Red, Yellow, Blue) pair of images may be constructed according to one embodiment of the present disclosure;

FIG. 10 shows two exemplary CFA layers that may be used in a multi-layer organic CMOS sensor according to one embodiment of the present disclosure;

FIGS. 11A-11B illustrate how the dual RGB-RWB imaging approach according to particular embodiments of the present disclosure may be implemented using a stacked CMOS sensor;

FIG. 12 shows an exemplary CFA layer atop a stacked X3 sensor array and the corresponding ISP-constructed images as per teachings of particular embodiments of the present disclosure.

DETAILED DESCRIPTION

Figure 1:
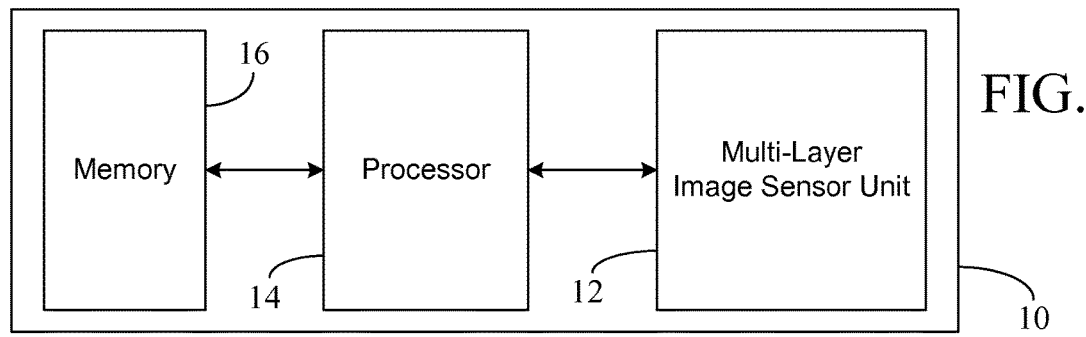
FIG. 1 shows a highly simplified, partial layout of a system according to one embodiment of the present disclosure.

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail so as not to obscure the present disclosure. Additionally, the described inventive aspects can be implemented to improve image quality in any imaging device or system, including, for example, a smartphone, a User Equipment (UE), a laptop computer, a machine vision system, and the like.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "two-dimensional," "photo-site", "pixel-specific, " etc.) may be occasionally interchangeably used with its non-hyphenated version (e.g., "two dimensional," "photo-site", "pixel specific," etc.), and a capitalized entry (e.g., "Red," "White," "Color Correction Matrix," etc.) may be interchangeably used with its non-capitalized version (e.g., "red," "white," "color correction matrix," etc.). Such occasional interchangeable uses shall not be considered inconsistent with each other.

It is noted at the outset that the terms "coupled," "operatively coupled," "connected", "connecting," "electrically connected," etc., may be used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. However, such usage is for simplicity of illustration and ease of discussion only; it does not imply that the construction or architectural details of such components or units are the same across all embodiments or such commonly-referenced parts/modules are the only way to implement the teachings of particular embodiments of the present disclosure.

From the earlier discussion, it is observed that, through appropriate ISP, the current CMOS RWB sensor can achieve +3 B YSNR increase than the current CMOS RGB sensor. However, as also noted before, the CMOS RWB sensor also generally suffers from more artifacts such as, for example, colorblindness, chromatic aberration, and saturation, than its RGB counterpart. In other words, the RWB sensor is better than the RGB sensor in some aspects, but the RGB sensor is better than the RWB sensor in other aspects. Thus, in the RWB sensor that only captures an RWB image, it becomes difficult to obtain the image quality-enhancing aspects of an RGB sensor. Similarly, in an RGB-only sensor, it becomes difficult to obtain the image quality-enhancing aspects of the RWB sensor.

It is therefore desirable to have a CMOS sensor configuration in which both the RGB as well as the RWB images are captured in a single shot so that subsequent image processing stage(s) can choose between RGB and RWB images, whichever will generate fewer artifacts at problematic image regions. Such dual RGB-RWB sensor architecture can thus take full advantage of the improved ISP—like the earlier-mentioned Clarity+ ISP application—to achieve not only increased YSNR, but also reduced colorblindness and chromatic aberration.

In contrast to the individual RWB or RGB imaging based conventional CMOS sensors, particular embodiments of the present disclosure provide for a CMOS sensor having multiple layers of CFAs to capture both the RGB and RWB images in a single shot on the same sensor chip. Such a multi-layer sensor may be, for example, an organic sensor or a stacked X3 sensor. By obtaining dual RGB-RWB images (practically simultaneously) and appropriately processing them using the associated ISP, a CMOS sensor according to particular embodiments of the present disclosure can achieve +1 dB YSNR increase over the current RWB sensor and +4 dB YSNR increase over the current RGB sensor. Furthermore, a multi-layer CMOS sensor according to the teachings of the present disclosure can also overcome the earlier-mentioned disadvantages associated with the current CMOS RWB sensors and can be easily manufactured with a slight modification of the existing organic or stacked sensor designs. Thus, the sensor configuration as per teachings of the present disclosure can be implemented in various electronic devices—portable or non-portable—such as, for example, smartphones, tablets, UEs, laptop computers, Virtual Reality (VR) equipments, robots, and the like.

FIG. 1 shows a highly simplified, partial layout of a system 10 according to one embodiment of the present disclosure. As shown, the system 10 may include a multi-layer image sensor unit 17 coupled to and in communication with a processor or host 14. The system 10 may also include a memory module 16 coupled to the processor 14 to store information content such as, for example, image data received from the image sensor unit 12. In particular embodiments, the entire system 10 may be encapsulated in a single Integrated Circuit (IC) or chip. Alternatively, each of the modules 12, 14, and 16 may be implemented in a separate chip. Furthermore, the memory module 16 may include more than one memory chip, and the processor module 14 may comprise of multiple processing chips as well. In any event, the details about packaging of the modules in FIG. 1 and how they are fabricated or implemented—in a single chip or using multiple discrete chips—are not relevant to the present discussion and, hence, such details are not provided herein.

The system 10 may be any image/video capture device configured for dual RGB-RWB imaging as per teachings of the present disclosure. The system 10 may be portable or non-portable. Some examples of the portable version of the system 10 may include popular consumer electronic gadgets such as, for example, a mobile device, a cellphone, a smartphone, a User Equipment (UE), a tablet, a digital camera, a laptop or desktop computer, an electronic smartwatch, a Machine-to-Machine (M2M) communication unit, a Virtual Reality (VR) equipment or module, a robot, and the like. On the other hand, some examples of the non-portable version of the system 10 may include a game console in a video arcade, an interactive video terminal, an automobile, a machine vision system, an industrial robot, a VR equipment, and so on. The RGB-RWB single-shot dual-imaging functionality provided as per teachings of the present disclosure may be used in many applications such as, for example, virtual reality applications on a virtual reality equipment, online chatting/gaming, robotics and machine vision applications, automobile applications such as autonomous driving applications, and the like.

In particular embodiments, the image sensor unit 12 may be a multi-layer CMOS sensor, some exemplary constructional details of which are discussed below with reference to FIG. 2. As noted earlier, the multi-layer CMOS sensor 12 may be an organic sensor or a stacked X3 sensor configured for dual imaging as per teachings of the present disclosure.

In one embodiment, the processor 14 may be a Central Processing Unit (CPU), which can be a general purpose microprocessor. In the discussion herein, the terms "processor" and "CPU" may be used interchangeably for ease of discussion. However, it is understood that, instead of or in addition to the CPU, the processor 14 may contain any other type of processors such as, for example, a microcontroller, a Digital Signal Processor (DSP), a Graphics Processing Unit (GPU), a dedicated Application Specific Integrated Circuit (ASIC) processor, and the like. Furthermore, in one embodiment, the processor/host 14 may include more than one CPU, which may be operative in a distributed processing environment. The processor 14 may be configured to execute instructions and to process data according to a particular Instruction Set Architecture (ISA) such as, for example, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 14 may be a System on Chip (SoC) having functionalities in addition to a CPU functionality.

In particular embodiments, the memory module 16 may be a Dynamic Random Access Memory (DRAM) such as, for example, a Synchronous DRAM (SDRAM), or a DRAM-based Three Dimensional Stack (3DS) memory module such as, for example, a High Bandwidth Memory (HBM) module, or a Hybrid Memory Cube (HMC) memory module. In other embodiments, the memory module 16 may be a Solid State Drive (SSD), a non-3DS DRAM module, or any other semiconductor-based storage system such as, for example, a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), a Spin-Transfer Torque MRAM (STT-MRAM), and the like.

Figure 2:
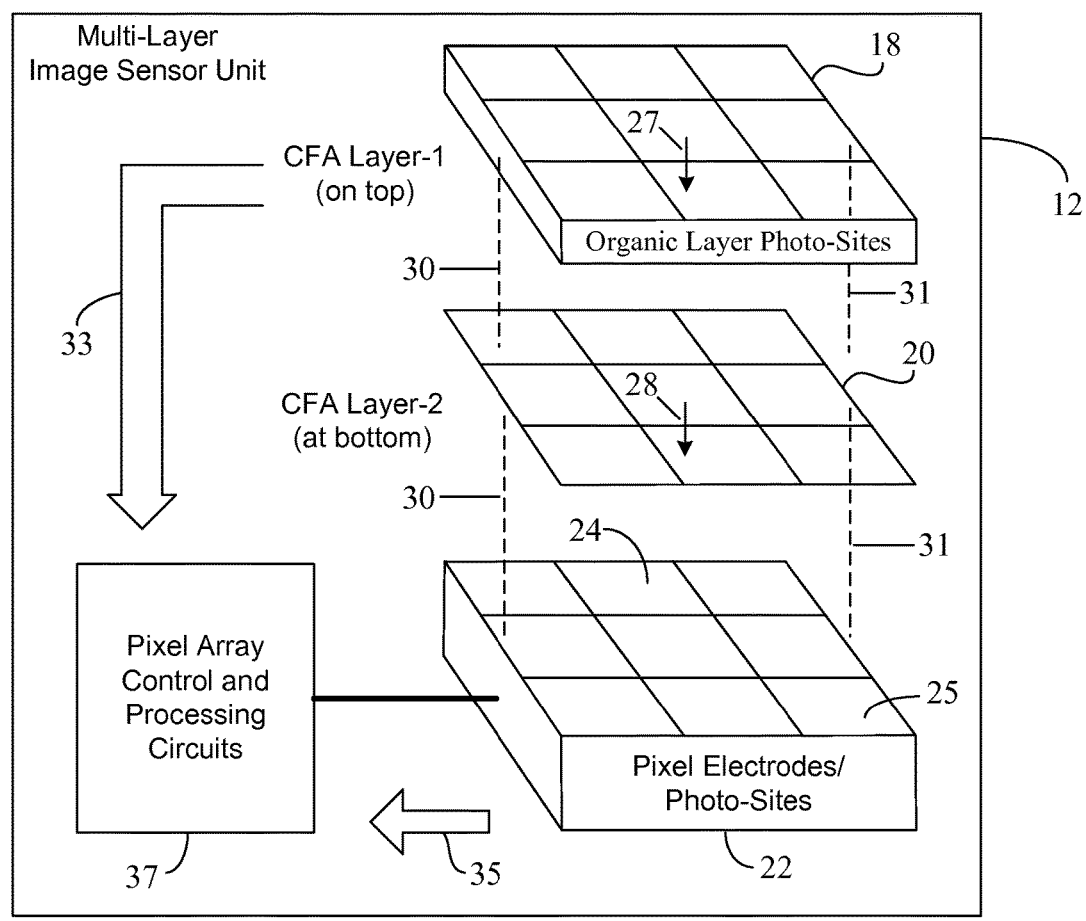
FIG. 2 illustrates an exemplary architectural layout of the image sensor unit in FIG. 1 according to one embodiment of the present disclosure.

FIG. 2 illustrates an exemplary architectural layout of the image sensor unit 12 in FIG. 1 according to one embodiment of the present disclosure. As mentioned earlier, in particular embodiments, the image sensor unit 12 may be a multi-layer CMOS sensor, which may be a CMOS sensor with multiple layers of color filter arrays. In the embodiment of FIG. 2, two such CFA layers—a top layer 18 and a bottom layer 20—are shown by way of an example. The CFA layers 18, 20 are shown separately for ease of illustration only. In an actual multi-layer sensor, the CFA layers 18, 20 may be overlaid on a pixel array 22. It is known that, in photography, a color filter array (CFA) is a mosaic of tiny color filters placed over each pixel electrode or photosite of an image sensor to capture color information. Color filters may be needed because the typical pixel electrodes in a semiconductor image sensor detect light intensity with little or no wavelength-specificity and, hence, these electrodes cannot separate color information. The color filters filter the light by wavelength range, such that the separately-filtered intensities include information about the color of light. For example, an RGB CFA gives information about the intensity of light in red, green, and blue wavelength regions. The raw image data captured by the image sensor is then converted to a full-color image—with intensities of all three primary colors R, G, B represented at each pixel—by a demosaicing algorithm, which may be tailored for each type of color filter.

The pixel array 22 may be a two-dimensional (2D) pixel array such as, for example, the 3×3 pixel array shown in FIG. 2. It is understood that the 3×3 pixel array 22 is shown for ease of illustration only; modern pixel arrays contain thousands or even millions of pixels. Each of the CFA layers 18, 20 may have a geometry similar to the pixel array 22 in the sense that, when CFA layers 18, 20 are overlaid on the pixel array 22 (as shown by the illustrative arrows 27-28 and dotted lines 30-31 in FIG. 2), each pixel location in the pixel array 22 may have one location-specific color filter from each CFA layer 18, 20 associated with it. Although all nine (9) pixel locations may be identified using respective reference numerals, only two such pixel locations 24-25 are identified in FIG. 2 for ease of illustration and clarity of the drawing. Thus, in the embodiment of FIG. 2, each pixel location may have two location-specific color filters associated with it: one color filter from the CFA layer 20 and one color filter from the CFA layer 18.

In one embodiment, the multi-layer CMOS sensor 12 may be a CMOS organic sensor, in which case, the top CFA layer 18 may be a wavelength-selective semi-transparent organic (carbon-based) photo-conversion layer and the bottom CFA layer 20 may be a non-organic filter array of a desired color pattern (as discussed later, for example, with reference to FIGS. 6-9). In certain embodiments, more than one organic filter layers may be present—each layer sensitive to a particular color of light. Alternatively, a single organic layer having color filters for multiple different colors also may be implemented as shown, for example, in the embodiment of FIG. 10. In particular embodiments, the organic layer 18 may be sensitive to green color only, in which case, the organic layer 18 may generate electrical signals only when it detects green light. The incident light having other colors—such as, for example, the primary colors red and blue—may however pass through the semi-transparent organic layer 18 and be detected by appropriate color filters in the bottom CFA layer 20. As shown, the organic layer 18 may include its own organic layer-specific photo-sites or pixel electrodes to convert incident photons having a specific wavelength (such as the wavelength of the green light) into electrical signals—which are symbolically represented by arrow 33 in FIG. 2, while allowing photons of other wavelengths to pass through. In the discussion herein, however, the term "pixel location" is used primarily with reference to pixels in the pixel array 22, and, hence, pixel electrodes or photo-sites of the organic layer 18 are neither individually identified nor discussed in further detail because of lack of relevance of the constructional details of the organic layer 18 to the discussion below. In one embodiment, the organic layer 18 may be a green light-sensitive Organic Photodiode (OPD). For the consistency of illustration, the organic layer 18 in FIG. 2 is shown to be divided into multiple filter locations to correspond with the similar geometrical configuration of the pixel locations in the pixel array 22. However, in particular embodiments, the organic layer 18 may be a thin and continuous (or undivided) film/sheet of photo-sensitive organic material overlaid on a mosaic of organic layer-specific photo-sites.

It is noted here that only "active" photosites or pixel electrodes—whether as part of the organic CFA layer 18 or as part of the pixel array 22—that convert incident photons having specific wavelengths into respective electrical signals, which are useful in constructing the dual RGB-RXB images as discussed below, are relevant to the present disclosure. Such electrical signals are collectively identified, for example, using the arrow 42 in FIG. 3 (discussed later). Hence, only these "active" photosites are shown in FIG. 2, and the discussion herein should be understood to be with reference to such photosites only. Similarly, the term "pixel location" also should be understood to be with reference to only such "active" pixels in the pixel array 22.

Although not shown in FIG. 2, in some embodiments, there may be micro-lenses laid on top of the CFA layer 18 to concentrate incident light onto the underlying CFA layers 18, 20, for eventual detection by the pixel electrodes (or photo-sites) in the pixel array 22 and in the organic layer 18. In other embodiments, the micro-lenses may be part of the non-organic CFA layer 20. In another embodiment, the order of placement of the layers 18, 20 may be reversed—the non-organic layer 20 may be at the top and the organic layer 18 may be at the bottom. In another embodiments, the micro-lenses may be laid over the pixel electrodes (in the pixel array 22), and the CFA layers 18, 20 may be placed over these micro-lenses. In any event, how incident light is collected and sent to the photosites in the pixel array 22 is irrelevant to the present disclosure and, hence, additional details of this process and related architectural arrangement are not provided herein. There may be additional collection optics present in the system 10 as well. Such additional optics may include, for example, a focusing lens, a glass/plastics surface, or other cylindrical optical element that concentrates the received light onto one or more pixels in the pixel array 22. This light may include, for example, one or more of the following: ambient light, light reflected/refracted from an illuminated object (such as, for example, a human face illuminated by a camera flash), or light emitted from an object (such as, for example, a fluorescent object). In the present discussion, how light is received by the image sensor unit 12 is irrelevant and, hence, discussion related to the source of the received light is omitted.

In one embodiment, the bottom CFA layer 20 may include color filters in a specific arrangement such as, for example, in a Bayer pattern. In another embodiment, the organic layer 18 also may include a plurality of color filters arranged according to the Bayer pattern as shown, for example, in the embodiment of FIG. 10. Different pixels in the pixel array 22 may collect light signals of different colors, as received from the CFA layer 20, and then may convert the received photons into corresponding electrical signals. The constructional details of pixel electrodes (or photo-sites) and associated pixel-output collection circuits/signals (such as, for example, the transistor layout of each pixel electrode, row/column selection and reset signals for the pixel array, pixel charge transfer initiation signals, Analog-to-Digital Converter (ADC) unit, and the like) are not relevant to the present disclosure and, hence, such details are not provided herein. The electrical signals output by the pixel array 22 are symbolically represented using the arrow 35. A pixel array control and processing unit 37 may be coupled to the pixel array 22 to receive and process these pixel outputs, as well as the electrical outputs—symbolically illustrated by the arrow 33—received from the organic CFA layer 18. In particular embodiments, the processing unit 37 may also include relevant circuits for controlling the operation of the pixel array 22 and to perform ISP on the received color signals. The image processing as part of the ISP may include, for example, generation of the RGB and RWB images as per teachings of the present disclosure, as discussed below.

In particular embodiments, instead of the earlier-mentioned organic sensor configuration, the multi-layer image sensor unit 12 may be a stacked X3 CMOS sensor such as that shown in the exemplary embodiment of FIG. 11B or a stacked organic sensor having multiple wavelength-selective organic layers stacked on top of each other. For example, a conventional Foveon X3 CMOS sensor—as shown in FIG. 11A—may be modified as per teachings of the present disclosure by adding one or more CFA layers on top of the stacked sensor's pixel array so as to obtain dual RGB and RWB images for improved imaging. In the context of FIG. 2, the pixel array 22 may represent such a conventional stacked array and the CFA layers 18, 20 may be the additional layers of color filters added on top of the stacked sensor configuration. The CFA layer 18 may or may not be an organic layer in the stacked sensor-related embodiments, and, in certain embodiments, the CFA layer 18 may be absent as, for example, in case of the embodiment in FIG. 11B. As before, the pixel array processing unit 37 may receive and process electrical signals from the stacked sensor's pixel array 22 to generate the RGB and RWB images as per teachings of the present disclosure, as discussed below.

The processor 14 may control the operations of the image sensor unit 12. For example, the processor 14 may "turn on" or "activate" the image sensor unit 12 to capture image data when a user initiates an imaging operation. The processed image data received from the pixel array processing unit 37 may be stored by the processor 14 in the memory 16. Alternatively, in certain embodiments, the processor 14 itself may comprise the pixel array processing circuits 37, in which case the processor 14 may perform the desired image signal processing (ISP) to generate the dual images—RGB as well as RWB—as per teachings of the present disclosure. The processor 14 may also display the final image on a display screen (not shown) of the device 10. The processor 14 and the pixel array control unit 37 may be programmed in software or firmware to carry out various processing tasks described herein. Alternatively or additionally, the processor 14 and the pixel array control unit 37 may comprise programmable hardware logic circuits for carrying out some or all of their functions. In particular embodiments, the memory 16 may store program code, look-up tables, and/or interim computational results to enable the processor 14 to carry out its functions.

Figure 3:
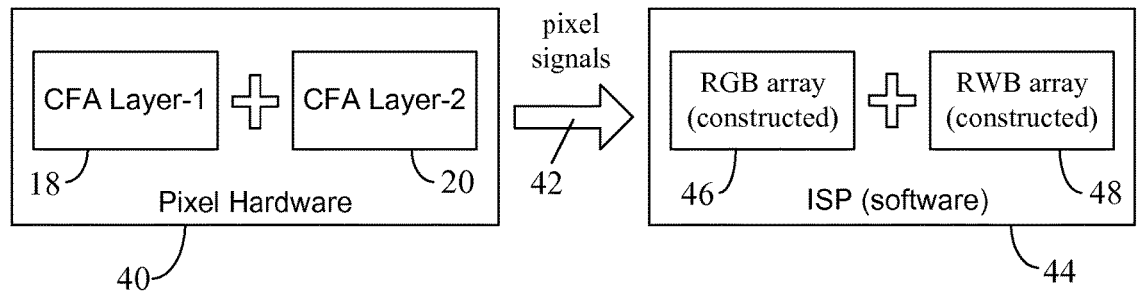
FIG. 3 is an exemplary outline of how dual RGB-RXB images may be obtained according to particular embodiments of the present disclosure.

FIG. 3 is an exemplary outline of how dual RGB-RXB images may be obtained according to particular embodiments of the present disclosure. As shown, the CFA layers 18, 20 may be part of a hardware portion 40, which may include pixel hardware such as, for example, pixel electrodes and ancillary circuits to generate pixel signals in response to detection of incident light. The pixel hardware block 40 may be part of the image sensor unit 12 shown in FIG. 2. As noted earlier, the CFA layer-1 may be an organic layer, and the CFA layer-2 may be a non-organic layer with color filters arranged in a pre-determined color pattern such as the Bayer pattern. In case of a stacked CMOS sensor, the CFA layer-1 may be absent in particular embodiments. Regardless of whether the pixel hardware 40 is part of an organic CMOS sensor or a stacked X3 CMOS sensor, the pixel hardware 40 would generate electrical pixel signals—symbolically represented by arrow 42 in FIG. 33—upon detecting and converting received light into respective electrical charges. For example, in case the CFA layer-1 is an organic layer, pixel signals output by that organic layer 18 would include electrical signals corresponding to a specific wavelength (for example, green light). Furthermore, the pixel array 22 may also generate respective pixel signals upon receiving different colors of light from the color filters in the CFA layer-2. The reference numeral "42" collectively refers to electrical signals generated by the CFA layer 18 as well as the CFA layer 20. The pixel signals 42 associated with the CFA layers 18, 20 may be then processed using an image signal processing (ISP) application or software 44. In one embodiment, the ISP application 44 may be part of the pixel control unit 37 and be executed by processing circuits therein. In another embodiment, the ISP software 44 may be executed by the processor 14. As discussed below, the combination of the color filters in the CFA layers 18, 20 according to the teachings of the present disclosure may be such that when the pixel signals 42 are processed by the ISP application 44, the processing would generate two color patterns/arrays—an RGB array 46 and an RXB array 48, where "X" refers to white, yellow, or cyan colors in particular embodiments. Thus, the ISP application 44 may be configured to selectively combine pixel signals associated with each pixel location to construct the dual RGB-RXB images, as discussed below. In some embodiments, the ISP functionality may be implemented using a combination of hardware and software/firmware, or entirely in hardware.

Figure 4:
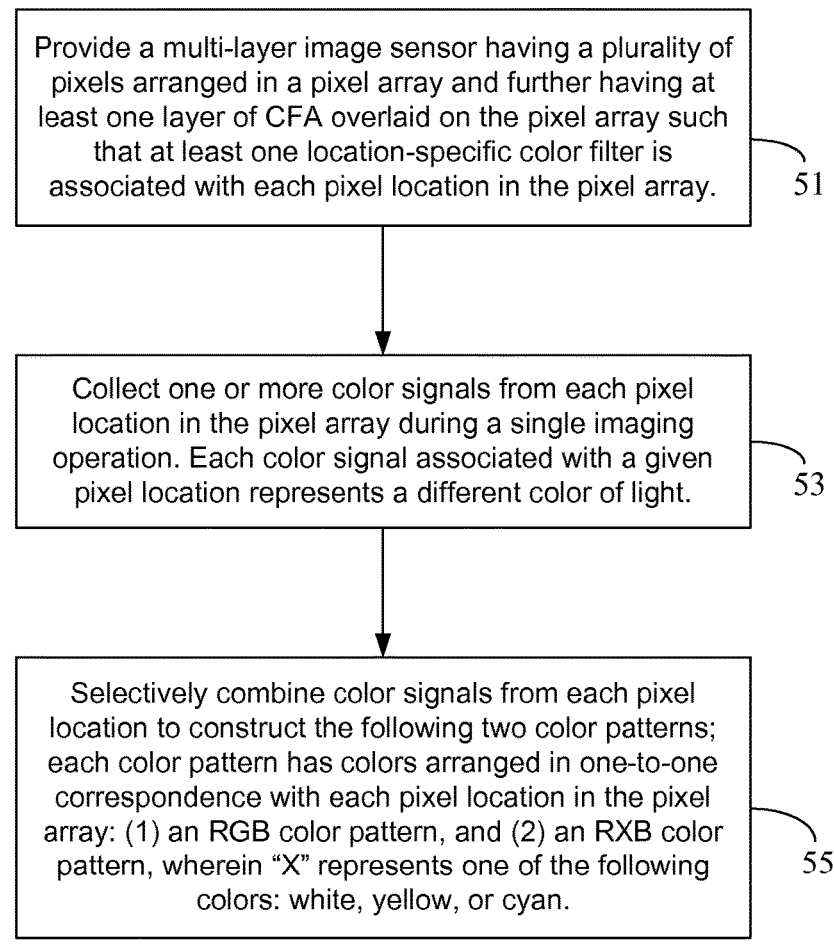
FIG. 4 depicts an exemplary flowchart showing how dual RGB and RXB color patterns may be generated on the same image sensor chip in a single imaging operation according to one embodiment of the present disclosure.

FIG. 4 depicts an exemplary flowchart 50 showing how dual RGB and RXB (such as RWB) color patterns may be generated on the same image sensor chip, such as the image sensor unit 12, in a single imaging operation according to one embodiment of the present disclosure. The imaging operation may include, for example, taking of a picture/photograph or video of a scene or an object. A single shot such as, for example, a user's selecting or pressing a button/switch only once to shoot a picture or snapshot of a scene, may constitute the "single imaging operation." The button or switch may be part of a camera, such as a camera that embodies the system 10 in FIG. 1. Various steps illustrated in FIG. 4 may be performed by a single module or a combination of modules or system components in the system 10. In the discussion herein, by way of an example only, specific tasks are described as being performed by specific modules or system components. Other modules or system components may be suitably configured to perform such tasks as well.

Initially, at block 51, a multi-layer image sensor, such as the CMOS image sensor 12 in FIGS. 1-2 may be provided, either as an independently-existing imaging unit or as part of a system, such as the system 10 discussed earlier. The image sensor may have a plurality of pixels arranged in a pixel array, like the pixel array 22 in FIG. 2, and may also have at least one layer of CFA overlaid on the pixel array such that at least one location-specific color filter is associated with each pixel location in the pixel array as illustrated in the exemplary embodiment of FIG. 2. Unless otherwise specified, the terms like "pixels," "pixel location," "pixel electrode" are primarily used herein in the context of the pixel array 22 in FIG. 2, and not with reference to the pixel electrodes forming the organic CFA layer 18. At block 53, the pixel control unit 37 (or the processor 14 comprising such control unit) may collect one or more color signals from each pixel location in the pixel array during a single imaging operation. Each color signal may be associated with a respective one of the color filters at a given pixel location, and each color signal associated with the given pixel location may represent a different color of light as discussed in more detail later below. The color signals may be electrical signals that are collectively represented by the pixel signals 42 in the embodiment of FIG. 3. As mentioned before, the ISP application 44 (FIG. 3) or a combination of hardware/software in the pixel control unit 37 having ISP functionality may selectively combine color signals from each pixel location to construct RGB as well as RXB color patterns (block 55). Each color pattern may have colors arranged in one-to-one correspondence with each pixel location in the pixel array, as shown in the exemplary embodiment of FIG. 5 discussed later. As also noted before, the letter "X" in the term "RXB" may refer to one of the following colors: White (W), Yellow (Y), or Cyan (C). Hence, in particular embodiments, the RGB-RWB, RGB-RYB, or RGB-RCB color patterns may be constructed from pixel signals 42, as discussed in more detail later with reference to FIGS. 7-9. As noted before, the availability of the RGB as well as RXB images in a single shot may enable subsequent image processing stages to choose between an RGB or an RXB image, whichever will generate fewer artifacts at problematic image regions.

It is noted that, in the discussion herein, the term "image"—as in "RGB image", "RWB image", "RXB image", and the like—may be occasionally used interchangeably with the terms "pattern", "color pattern," or "array"—as in "RGB pattern," "RGB array," "RWB pattern", "RXB color pattern", and the like. All such interchangeable usages are essentially in relation to an intermediate color pattern/array constructed by the ISP software according to teachings of the present disclosure as part of the ISP pipeline (discussed later with reference to FIG. 6) and prior to the final image is generated/rendered. In the embodiment of FIG. 3, such intermediate color patterns/images are identified using reference numerals "46" and "48", and may be generated, for example, through the color signal combination operation described with reference to block 55 in FIG. 4. In particular embodiments, these intermediate images or color patterns may be used to generate the "final image" presented or displayed to a user as a result of an imaging operation. Thus, unless otherwise specified, in certain embodiments, the final image may not be the same as the intermediate RGB and RXB images generated and used during the ISP pipeline. Such distinction may be evident from the context of discussion herein.

Before continuing further, it is noted that the embodiments illustrated in FIGS. 5 and 7-10 relate to multi-layer organic CMOS sensors configured to implement the dual RGB-RXB imaging as per teachings of the present disclosure. On the other hand, the embodiments illustrated in FIGS. 11-12 relate to stacked CMOS sensors configured to implement the dual RGB-RXB imaging as per teachings of the present disclosure. The embodiments illustrated in FIGS. 1-4, 6 and 13 apply to any CMOS sensor—whether organic or stacked or any other type—that is operable to perform dual RGB-RXB imaging as per teachings of the present disclosure.

Figure 5:
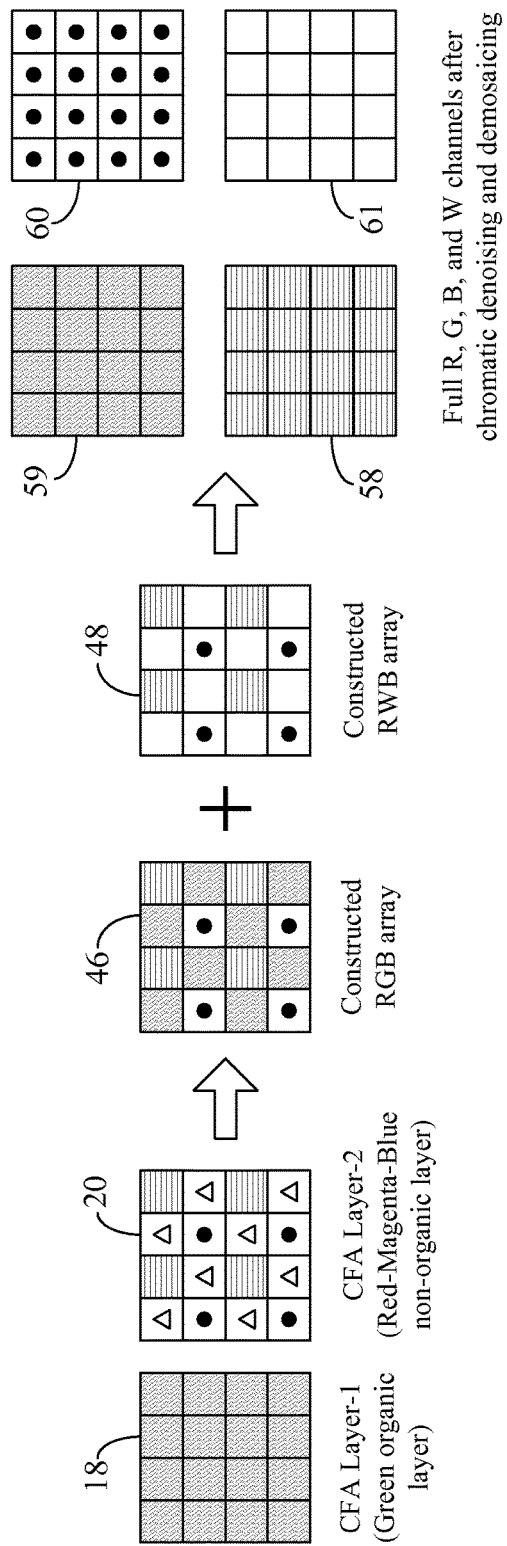
FIG. 5 is an illustration of how the dual RGB and RWB images may be constructed using an exemplary pair of CFA layers in a multi-layer organic CMOS sensor according to one embodiment of the present disclosure.

FIG. 5 is an illustration of how the dual RGB and RWB images may be constructed using an exemplary pair of CFA layers in a multi-layer organic CMOS sensor according to one embodiment of the present disclosure. For ease of discussion, the CFA layers and constructed color patterns in FIGS. 5, 7-10 and 12 are identified using the same reference numerals as those used in the context of FIGS. 2-3, even though the filter arrays and the constructed color patterns in these figures are shown having a 4×4 configuration as opposed to the 3×3 arrangement in FIG. 2. Like the earlier 3×3 layout, the 4×4 layout in FIGS. 5, 7-10, and 12 is for the sake of illustration only. The color filtering approach discussed by way of the 4×4 array based examples herein may be implemented with any size of pixel array in a multi-layer image sensor.

As shown in FIG. 5, a multi-layer organic CMOS sensor, such as, for example, the CMOS sensor 12 in FIGS. 1-2, may be configured such that the top CFA layer 18 is a Green (G) organic layer, whereas the bottom non-organic CFA layer 20 has color filters in a Red-Magenta-Blue (RMB) color pattern. As noted before, an organic CMOS sensor usually contains more than one filter layer, unlike a traditional CMOS sensor. Thus, in an organic sensor, the traditional photo-sites—like the pixel array 22 in FIG. 2—are overlaid with multiple filter layers such as, for example, one or more layers of semi-transparent organic materials in combination with one or more layers of non-organic color filters. Hence, an organic sensor is capable of capturing more than one color at a pixel location. A typical organic sensor may consist of one organic filter layer on top and one traditional (non-organic) CFA layer at the bottom. In the embodiment of FIG. 5, the organic material in the CFA layer 18 is sensitive to the green light only, which represents the middle wavelength in the wavelength range (or spectrum) of the visible light. Thus, the organic layer 18 is able to capture the green primary color, whereas the light signals of the red and the blue primary colors—which represent the long and the short wavelength signals in the visible light spectrum, respectively—can penetrate the organic layer and reach the photo-sites underneath, where red and blue lights are captured using appropriate color filters in the RMB CFA 20.

It is observed from FIG. 5 that two distinct colors may be captured—for example, by the pixel control unit 37 in FIG. 2—for each pixel location. For example, the pixel locations corresponding to the magenta filters also have corresponding green light signals associated therewith because of the organic filter layer 18 on top of the non-organic filter layer 20. Similarly, red and green colors would be captured for pixel locations associated with the red color filters in the CFA layer 20, and so on. Thus, when all pixel signals 42 (FIG. 3) associated with the filter layers 18, 20 are received by the ISP application 44 (FIG. 3), the ISP application may be configured to selectively combine the available color signals to construct the RGB color array 46 and the RWB color array 48. For example, the White (W) color may be generated by adding the magenta color with green color because green color is sensitive to the middle wavelength of the visible light spectrum, whereas magenta color is sensitive to both the long and the short wavelength signals in the visible light spectrum. Therefore, the combination of green and magenta represents signals from all visible light wavelengths—that is, the white color. Thus, the ISP software 44 may "selectively combine" various color signals in the sense that the ISP software 44 may combine only the magenta and green color signals from each pixel location corresponding to a magenta filter to generate the white color for those pixel locations, but leave the red and blue color signals uncombined with their respective green color counterparts. The ISP software 44 may then replace each occurrence of the magenta color in the RMB color pattern (received in connection with the RMB CFA layer 20) with the white color so generated, thereby constructing the RWB color pattern 48 shown in FIG. 5. On the other hand, the ISP software 44 may also replace each occurrence of the magenta color in the RMB color pattern (received in connection with the RMB CFA layer 20) with the corresponding green color from the organic layer 18 to construct the RGB color pattern 46 shown in FIG. 5. The constructed color arrays 46, 48 may follow the same type of color arrangement as that is present in the CFA layer 20. For example, in one embodiment, the RMB CFA layer 20 may have red, magenta, and blue color filters arranged in a Bayer pattern. In that case, the constructed RGB array 46 and the constructed RWB array 48 also may have colors arranged in the Bayer pattern as shown in FIG. 5.

It is noted that magenta color signals may be obtained by installing a magenta-passing filters (similar to red and blue color-passing filters) on top of the respective photo-sites, or by simply leaving those photo-sites filter-less (or with "clear" filters).

After the intermediate color patterns 46, 48 are constructed, the ISP pipeline may process the color content in these color patterns to generate individual color channels—the red channel 58, the green channel 59, the blue channel 60, and the white channel 61—to be used subsequently for obtaining the final image representing the result of the imaging operation mentioned earlier, such as, for example, at block 53 in FIG. 4. Each color channel may represent a specific color for each pixel location in the pixel array 22. The white channel 61 may be restored by filling in the missing components after a chromatic denoising operation on the RWB array 48. This can be achieved by interpolation or demosaicing. Various ISP operations are shown and discussed below with reference to FIG. 6. Similarly, the red channel 58 and the blue channel 60 may be generated as well using interpolation or demosaicing. The full green channel 59 can be restored in the same manner as well, in case the green channel is not fully captured by the green organic layer 18. After demosaicing, the resultant "image" will contain the full R, G, B, and W channels 58-61 shown in FIG. 5, enabling the ISP pipeline to further process this image using its color content.

Figure 6:
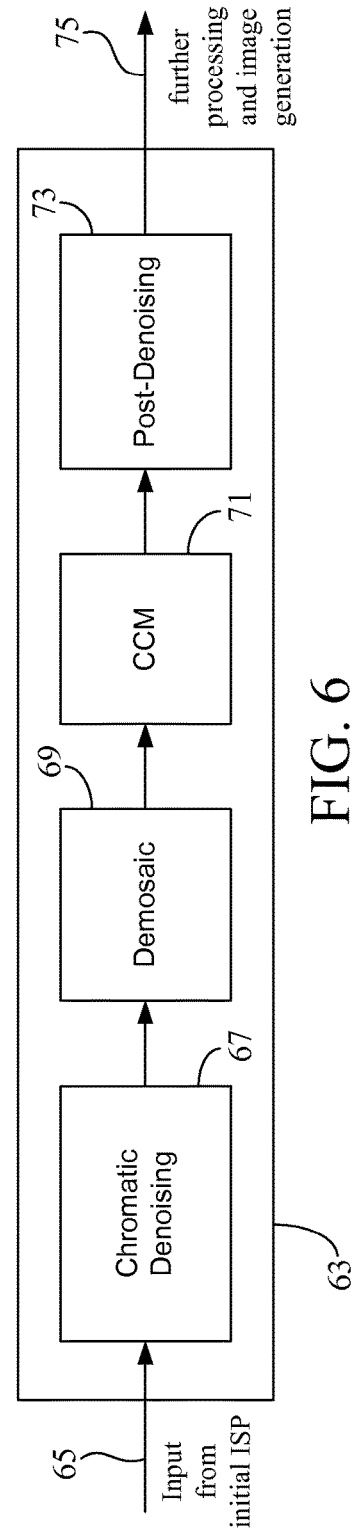
FIG. 6 shows a portion of an exemplary ISP pipeline according to one embodiment of the present disclosure.

FIG. 6 shows a portion of an exemplary ISP pipeline according to one embodiment of the present disclosure. This portion is illustrated using the dotted block 63 and, in one embodiment, its functionality may be implemented as part of the ISP application 44 in FIG. 3. The operations of various blocks in FIG. 6 are now briefly described with reference to the images shown in FIG. 5. The input at arrow 65 may include color signals generated during initial ISP. These signals include, for example, the color signals associated with the constructed RGB array 46 and the constructed RXB array 48 shown in FIG. 3. In the context of the embodiment in FIG. 5, the input at arrow 65 may include the color content associated with the constructed RGB and RWB arrays 46, 48, respectively. The chromatic de-noising operation at block 67 may be applied to an image, such as, for example, the RWB image 48 in FIG. 5, to correlate the noise in the white, red, and blue color channels of the RWB image 48. The de-mosaicing operation at block 69 may provide a resultant image that contains full R, G, B, and W channels 58-61, respectively. As mentioned before, the full green channel 59 can be obtained using interpolation or demosaicing on the green color content received from the green organic layer 18, in case the green channel is not fully captured by the green organic layer 18. In the resultant image generated after demosaicing, most of the noise will correlate to that from the white channel because of the availability of the RWB image 48 for de-noising. During the color correction step (at block 71) following the demosaicing operation, the white channel may be abandoned and only the R, G, and B channels may be used because, generally, the Color Correction Matrix (CCM) associated with an RGB array—such as the RGB array 46 in FIG. 5—has much smaller off-diagonal entries than that associated with an RWB array—such as the RWB array 48 in FIG. 5. A CCM with less off-diagonal entries may lead to less amplification of the noise during the color correction step at block 71. Finally, a post-denoising operation at block 73 may be applied to further remove noise and "stains" (or low frequency noise). The output image at arrow 75 may be further processed, as needed, to obtain the final full-color image resulting from the corresponding imaging operation. In that regard, the pixel array control unit 37 may be coupled to the processor 14 or may be part of the processor 14 in certain embodiments to enable the processor 14 to render a two-dimensional (2D) or three-dimensional (3D) depth image of a scene or object on a display screen (not shown) of the device 10. It is noted here that the dual RGB-RXB image generation approach as per teachings of the present disclosure may be used regardless of whether a 2D or a 3D image is to be captured through the corresponding single shot (or imaging operation).

Figure 7:
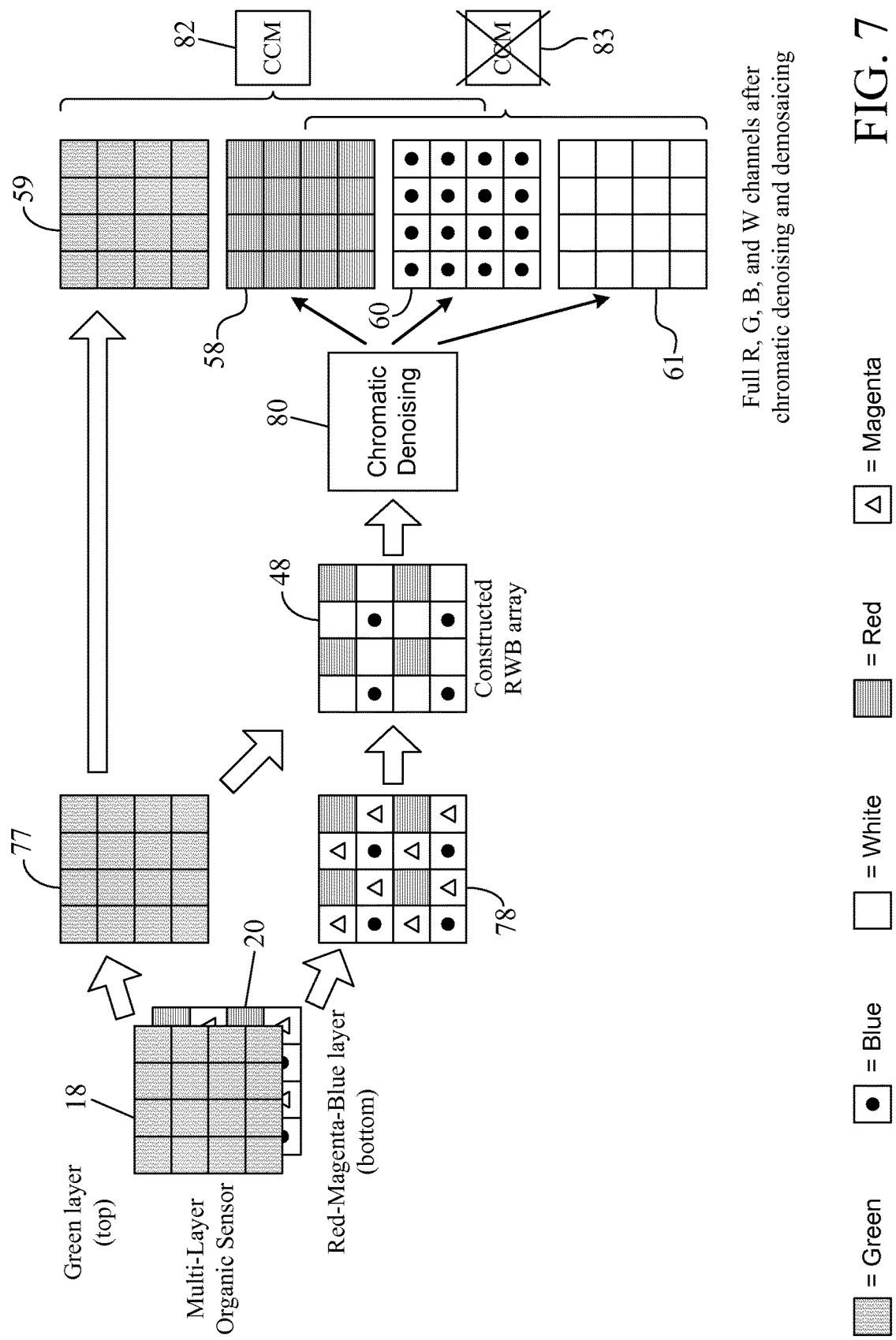
FIG. 7 illustrates more details of the ISP in the exemplary embodiment of FIG. 5.

FIG. 7 illustrates more details of the ISP in the exemplary embodiment of FIG. 5. As shown in FIG. 7, the green organic filter layer 18 and the underlying RMB filter layer 20 may result in color signals 42 (FIG. 3) that enable the ISP application—such as the ISP application 44 in FIG. 3—to generate a green-only color array 77 and an RMB color array 78. When the green color signals associated with the green array 77 are selectively combined with the magenta color signals associated with the RMB color array 78, the RWB array 48 may be constructed by the ISP as discussed before with reference to FIG. 5. A chromatic denoising operation on the RWB image 48 at block 80 (which represents the functionality of the denoising block 67 in FIG. 6) followed by demosaicing at block 69 (FIG. 6) may generate the full Red (R) channel 58, Blue (B) channel 60, and White (W) channel 61 as shown in FIG. 7. On the other hand, interpolation or demosaicing may be directly applied to the green array 77 to generate the full Green (G) channel 59. It is noted here that the illustration in FIG. 5 is a simplified depiction of the image processing shown in more detail in FIG. 7. In other words, the RGB array 46 may be constructed, if needed, using the color contents from the R channel 58, the G channel 59, and the B channel 60 at corresponding pixel locations. The constructed RGB array 46, however, is not shown in FIG. 7. As mentioned before, the color correction operation at block 71 may be performed using the CCM of the RGB array 46 and, hence, in that case, the RGB array 46 may be constructed by the ISP application 44 using the color contents available from individual R, G, and B channels. Thus, the order of progression of images shown in FIG. 5 is for illustrative purpose only; it does not imply that the RGB array 46 must be constructed before denoising and demosaicing operations are carried out. What is relevant in the present disclosure is that the RGB and RXB images are substantially simultaneously available on the same sensor chip in a single shot. Such availability of dual RGB-RXB images allows for improved image quality as noted before, and also discussed in further detail below.

Compared to conventional CMOS sensors (like an RGB CMOS sensor, an RWB CMOS sensor, or even an RGBW CMOS sensor), the CFA architecture and associated ISP according to teachings of the present disclosure can take full advantage of the availability of both RGB and RWB color arrays in a single imaging operation. For example, in chromatic denoising, the white color locations in the RWB image 48 may be used for noise cancellation, as opposed to the green color in the array 77 in FIG. 7. Because white light signals are less noisy than green signals due to their high quantum efficiency and high sensitivity, the image processed by chromatic denoising based on the white color content may contain less noise than that processed using the green color signals. Furthermore, the availability of the RGB content—such as, for example, the constructed RGB image 46 in FIG. 5—may allow the ISP software 44 to use the CCM for the RGB image in place of that for the RWB image 48 during the color correction stage (at block 71 in FIG. 6). This choice is illustrated by the CCM blocks 82-83 in FIG. 7. The CCM block 82 relates to the RGB channels 58-60, whereas the crossed-out CCM block 83 relates to the RWB channels 58, 60-61. The CCM block 83 is crossed out to indicate that the CCM for the RWB image need not be used because of the availability of the CCM 82 for the RGB image. Because the CCM 82 for the RGB image has smaller off-diagonal entries than the CCM 83 for the RWB image, the amplification of noise during the color correction stage may be minimized. The CCM block 82 in FIG. 7 may represent the CCM block 71 in FIG. 6. In this manner, the noise amplification in two key modules—the denoising module 67 and the CCM module 71—in the ISP pipeline 63 may be minimized and, hence, the noise in the final image is controlled and reduced.

FIGS. 8A-8B provide an exemplary illustration of how an RGB-RYB (Red, Yellow, Blue) pair of images may be constructed according to one embodiment of the present disclosure. Except for different CFA layers and resulting dual RGB and RYB images in the embodiment of FIGS. 8A-8B, the illustration in FIGS. 8A-8B is substantially similar to the illustration for the embodiment in FIGS. 5 and 7. Therefore, a very brief discussion of FIGS. 8A-8B is provided herein. Many of the reference numerals used in FIGS. 8A-8B are the same as those in FIGS. 2-3 and 5-7 for ease of discussion and simplicity of comparison of these figures. Such usage, however, does not imply that the embodiment in FIGS. 8A-8B is in any way identical to the embodiment in FIGS. 5 and 7, or that any of the circuit components, hardware/software, or processing modules are shared between these embodiments. On the contrary, each of these embodiments represents an alternative design for the two-layer architecture of the image sensor unit 12 shown in FIG. 2.

As shown in the embodiment of FIG. 8A, a green organic layer 18 may be used along with a Red-Blue (RB) non-organic CFA layer 20 in the image sensor unit 12 in FIGS. 1-2. The pixel signals 42 (FIG. 3) generated using these CFA layers 18, 20 may be processed by the ISP application 44 (FIG. 3) to construct an RGB image 46 and an RYB image 48 (representing the Yellow (Y) color for the "X" in the RXB image 48 in FIG. 3). The generation of such RGB and RXB images is already discussed in more detail with reference to discussion of FIGS. 5-7 and, hence, that discussion is not repeated in any significant detail herein.

The steps related to the construction of the images 46, 48 in FIG. 8A are shown in more detail in FIG. 8B, which is similar to FIG. 7. As shown in FIG. 8B, the color content of the green array 77 (resulting from the green organic layer 18) may be processed using interpolation or demosaicing to generate the full Green (G) color channel 59. The RYB array 48 having colors arranged in the Bayer pattern—as shown in FIG. 8B—may be constructed by selectively combining green color signals from the green array 77 with corresponding red color signals from the RB array 85 (resulting from the RB CFA layer 20 in FIG. 8B). The color signals may be combined at certain pre-determined pixel locations so as to obtain the Bayer pattern for the constructed RYB array 48. The other R and B content in the RB array 85 may not get combined with respective green signals and, hence, may remain unchanged. In the embodiment of FIG. 8B, the chromatic denoising at block 87 (which is functionally similar to block 67 in FIG. 6) may be performed based on the yellow color content in the RYB array 48, instead of the white color content (as in case of the embodiment in FIG. 7). The denoising may be followed by demosaicing at block 69 (FIG. 6) to generate the full Red (R) channel 58, Blue (B) channel 60, and Yellow (Y) channel 89 as shown in FIG. 8B. The RGB array 46 in FIG. 8A may be constructed, if needed, using the color contents from the R channel 58, the G channel 59, and the B channel 60 in FIG. 8B at corresponding pixel locations. The constructed RGB array 46, however, is not shown in FIG. 8B. The availability of the RGB content allows the ISP software 44 to use the CCM for the RGB image in place of that for the RYB image 48 during the color correction stage (at block 71 in FIG. 6). In FIG. 8B, the CCM block 90 relates to the RGB channels 58-60. The final image may be subsequently generated as discussed before with reference to FIGS. 6-7.

Figure 9A:
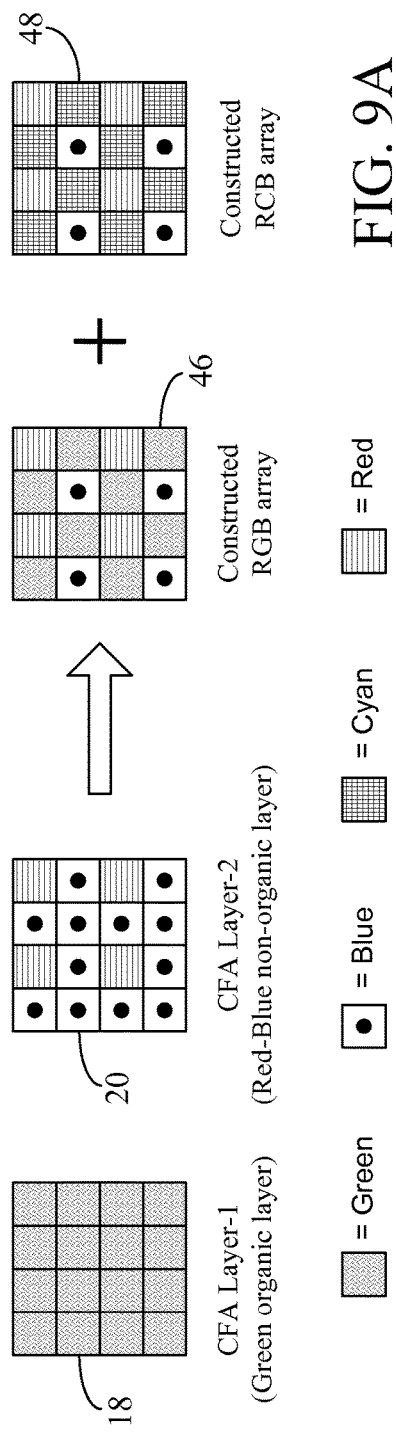
FIGS. 9A-9B provide an exemplary illustration of how an RGB-RCB (Red, Cyan, Blue) pair of images may be constructed according to one embodiment of the present disclosure.
Figure 9B:
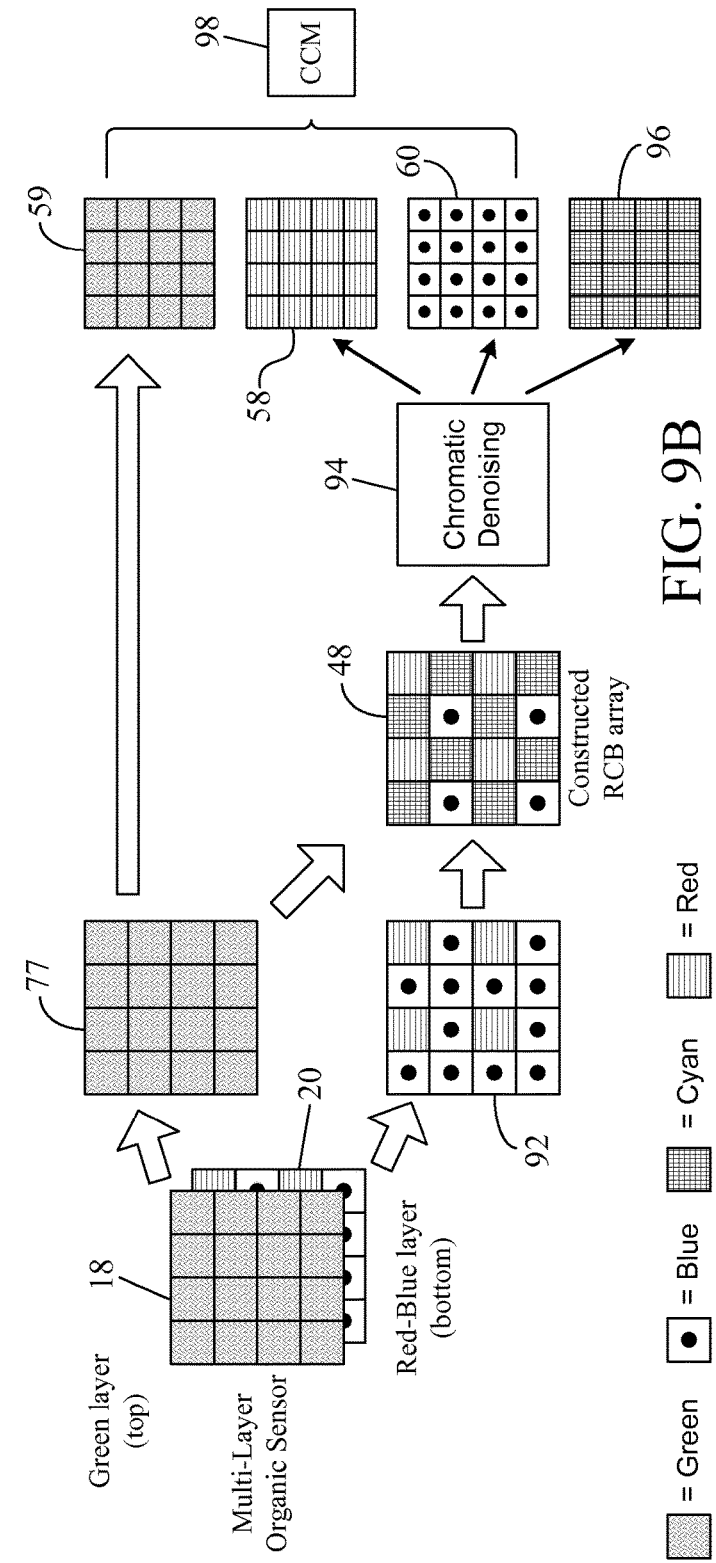

FIGS. 9A-9B provide an exemplary illustration of how an RGB-RCB (Red, Cyan, Blue) pair of images may be constructed according to one embodiment of the present disclosure. Except for different CFA layers and resulting dual RGB and RCB images in the embodiment of FIGS. 9A-9B, the illustration in FIGS. 9A-9B is substantially similar to the illustration in FIGS. 8A-8B. Therefore, a very brief discussion of FIGS. 9A-9B is provided herein. As in case of FIGS. 8A-8B, many of the reference numerals used in FIGS. 9A-9B are the same as those in FIGS. 2-3 and 5-7 for ease of discussion and simplicity of comparison of these figures. Such usage, however, does not imply that the embodiment in FIGS. 9A-9B is in any way identical to the embodiments in FIGS. 5, 7, and 8A-8B, or that any of the circuit components, hardware/software, or processing modules are shared among these embodiments. As noted before, each of these embodiments represents an alternative design for the two-layer architecture of the image sensor unit 12 shown in FIG. 2.

In the embodiment of FIG. 9A, a green organic layer 18 may be used along with a Red-Blue (RB) non-organic CFA layer 20 in the image sensor unit 12 in FIGS. 1-2. It is observed here that the arrangements of color filters in the RB CFAs in FIGS. 8A and 9A are different. The pixel signals 42 (FIG. 3) generated using the CFA layers 18, 20 in FIG. 9A may be processed by the ISP application 44 (FIG. 3) to construct an RGB image 46 and an RCB image 48 (representing the Cyan (C) color for the "X" in the RXB image 48 in FIG. 3). The generation of such RGB and RXB images is already discussed in more detail with reference to discussion of FIGS. 5-7 and, hence, that discussion is not repeated in any significant detail herein.

The steps related to the construction of the images 46, 48 in FIG. 9A are shown in more detail in FIG. 9B, which is similar to FIGS. 7 and 8B. As shown in FIG. 9B, the color content of the green array 77 (resulting from the green organic layer 18) may be processed using interpolation or demosaicing to generate the full Green (G) color channel 59. The RCB array 48 having colors arranged in the Bayer pattern—as shown in FIG. 9B—may be constructed by selectively combining green color signals from the green array 77 with corresponding blue color signals from the RB array 92 (resulting from the RB CFA layer 20 in FIG. 9B). It is pointed out here that the arrangement of colors in the RB array 92 in FIG. 9B is different from that in the RB array 85 in FIG. 8B because of different filter patterns in respective RB CFA layers in FIGS. 8B and 9B. The color signals may be combined at certain pre-determined pixel locations so as to obtain the Bayer pattern for the constructed RCB array 48. The other R and B content in the RB array 92 may not get combined with respective green signals and, hence, may remain unchanged. In the embodiment of FIG. 9B, the chromatic denoising at block 94 (which is functionally similar to block 67 in FIG. 6) may be performed based on the cyan color content in the RCB array 48, instead of the white color content (as in case of the embodiment in FIG. 7). The denoising may be followed by demosaicing at block 69 (FIG. 6) to generate the full Red (R) channel 58, Blue (B) channel 60, and Cyan (C) channel 96 as shown in FIG. 9B. The RGB array 46 in FIG. 9A may be constructed, if needed, using the color contents from the R channel 58, the G channel 59, and the B channel 60 in FIG. 9B at corresponding pixel locations. The constructed RGB array 46, however, is not shown in FIG. 9B. The availability of the RGB content allows the ISP software 44 to use the CCM for the RGB image in place of that for the RCB image 48 during the color correction stage (at block 71 in FIG. 6). In FIG. 9B, the CCM block 98 relates to the RGB channels 58-60. The final image may be subsequently generated as discussed before with reference to FIGS. 6-7.

FIG. 10 shows two exemplary CFA layers 100, 102 that may be used in a multi-layer organic CMOS sensor, such as the sensor 12 in FIGS. 1-2, according to one embodiment of the present disclosure. The CFA layer 100 may be used as the top organic layer 18 and the CFA layer 102 may be used as the bottom non-organic layer 20 in the embodiment of FIG. 2. In the embodiment of FIG. 10, the top organic layer 100 may be a Magenta-Yellow-Cyan (MYC) organic layer in which magenta, yellow, and cyan color filters may be arranged in the Bayer pattern as shown. Thus, instead of an organic layer that is wavelength-sensitive to a single color only—like the green organic layer 18 in FIGS. 5 and 7-9, the organic layer 100 may be designed to be selective to a plurality of colors such that different colors may be sensed at adjacent pixel locations. The bottom non-organic layer 102 may be a traditional Bayer pattern RGB CFA. Thus, in the embodiment of FIG. 10, the top and bottom CFA layers 100, 102 contain color filters of complementary colors at each pixel location. A color, when added to its "complementary" color, may produce the white color. Using the CFA configurations 100, 102 in the multi-layer CMOS sensor 12 in FIGS. 1-2, one RGB and one RWB image—like the RGB-RWB images 46, 48 in FIG. 3—can still be constructed by the ISP software 44 (FIG. 3) using the earlier-discussed approach of selective combination of color signals at desired pixel locations as per teachings of the present disclosure. It is observed that, in the embodiment of FIG. 10, the RGB image may be completely captured by the bottom layer CFA 102.

It is noted here that, besides the 2-layer CFA architecture shown in FIG. 2 and discussed previously in conjunction with FIGS. 3-10, the single shot-based dual image generation as per teachings of particular embodiments of the present disclosure may be implemented in a multi-layer image sensor 12 that has more than two CFA layers. For example, in one embodiment, the sensor 12 may be a 3-layer organic CMOS sensor in which two organic CFA layers may be present atop a non-organic CFA layer—like the CFA layer 20 in FIG. 2. In another embodiment, three organic CFA layers may be present along with a non-organic CFA layer. Alternatively, in certain embodiments, the non-organic layer may be completely absent, in which case, the multi-layer sensor 12 may contain three or more organic CFA layers only. Moreover, in all of the exemplary embodiments discussed herein, the colors captured by any pair of CFA layers at the same pixel location may be interchangeable through modified placement of those CFA layers. For example, in the two-layer embodiment of FIG. 2, the positions of the CFA layers 18, 20 may be interchanged such that the top layer 18 may become the bottom layer 20, and vice versa.

FIGS. 11A-11B illustrate how the dual RGB-RWB imaging approach according to particular embodiments of the present disclosure may be implemented using a stacked CMOS sensor. FIG. 11A shows a pixel 104 of an existing stacked CMOS sensor, which may be a Foveon X3® CMOS sensor designed by Foveon, Inc., of San Jose, Calif., USA (now part of the Sigma Corporation, Japan). FIG. 11B, on the other hand, shows how the pixel array of the existing stacked sensor in FIG. 11A, or any other similar stacked sensor, may be modified to implement the dual RGB-RWB imaging, as discussed later below. Referring now to FIG. 11A, it is observed that the Foveon sensor pixel 104 may include a pixel structure that consists of three vertically-stacked CMOS photosensors—a red sensor 106, a green sensor 107, and a blue sensor 108. Multiple such pixels 104 may be organized in a two-dimensional grid to form a pixel array (not shown). Each of the three stacked photosensors 106-108 may respond to a different wavelength of light because different wavelengths of light penetrate silicon to different depths. It is observed that the stacking of sensors in FIG. 11A may not require demosaicing because each pixel 104 has information about each color. The color signals from the three sensors 106-108 may be then processed, resulting in data about the three additive primary colors—R, G, and B.

Because a stacked X3 sensor captures full R, G, and B channels, the ISP in the system employing the stacked X3 sensors may be configured to produce the dual RGB-RWB images. For example, similar to the green organic layer 18 in the embodiments of FIGS. 5 and 7-9, the green channel is fully captured in each pixel 104 by the green sensor 107. Similarly, the red and blue channels are also captured by respective sensors 106, 108. Hence, the ISP may be configured to create an RMB (Red, Magenta, Blue) array—similar to the RMB array 78 in FIG. 7—by adding the red and blue colors at appropriate pixel locations to obtain the magenta color. Thereafter, the green channel may be used along with the created RMB array to construct an RWB image—similar to the RWB image 48 in FIG. 7. Also, the available R, G, and B channels may be used to construct an RGB image—like the RGB image 46 in FIG. 5. Thus, the dual RGB-RWB images may be constructed in a stacked CMOS sensor that contains a pixel array of pixels 104. However, in particular embodiments, this may not be an optimal or preferred approach because of the crosstalk problem in a stacked X3 sensor, as discussed below.

As shown in FIG. 11A, the Foveon pixel 104 may be quite small—depth less than five (5) microns and length approximately seven (7) microns. Because the depth of the pixel 104 in the silicon wafer is less than five microns, it may have a negligible effect on focusing or chromatic aberration. However, crosstalk may be a problem in the "vertical" pixel 104 because the collection depth of the deepest sensor layer (the red layer 106) is comparable to collection depths in conventional, non-stacked silicon CMOS or Charge-Coupled Device (CCD) sensors. Hence, in the stacked pixel 104, some diffusion of electrons and loss of sharpness, especially in the longer wavelengths (in the red color region of the visible light spectrum), may occur because spectral sensitivity functions of red, green, and blue colors may overlap a lot in the stacked pixel configuration. Due to the high cross talk in the existing stacked X3 sensor that has a plurality of pixels 104, the corresponding color correction matrix associated with its R, G, B channels usually has high off-diagonal entries. Thus, instead of minimizing noise amplification—as is the case with the CCM for an RGB image, the CCM for the R, G, B channels in the stacked X3 sensor may amplify the noise as much as the CCM for an RWB image, thereby reducing the final image quality even though dual RGB-RWB images are available during ISP as mentioned in the preceding paragraph. It is therefore desirable to modify the existing stacked X3 sensor design to improve its CCM by reducing the crosstalk among R, G, and B spectral sensitivity.

FIG. 11B illustrates an exemplary stacked sensor pixel configuration 110 where cross talk is reduced using a layer of CFA. Three stacked X3 sensor pixels 112-114—each similar to the pixel 104 in FIG. 11A—are shown in FIG. 11B with a CFA layer 116 overlaid on top. The pixels 112-114 may be part of a pixel array (not shown) consisting of multiple such pixels. Similarly, only a cross-sectional portion of the CFA layer 116 is shown in FIG. 11B. In particular embodiments, the CFA layer 116 may be overlaid on top of all the pixels in the stacked sensor-based pixel array. As shown, the CFA layer 116 may include an alternating arrangement of a blue filter 118 and a red filter 120 installed on top of the photo-sites 112, 114. As also shown, in the CFA layer 116, these color filters 118, 120 may be separated by a "clear filter" or the absence of a filter on top of the middle pixel 113. Such filter arrangement may reshape the spectrum of each received R, G, B color channel such that the cross-talk is reduced. In certain embodiments, the locations of the blue filters 118 and the red filters 120 in the CFA layer 116 may follow the pattern as in a typical Bayer CFA. As a result, the red (or blue) light is captured at pixel locations where red (or blue) filter is used, and the white light—representing the combination of all three colors R, G, and B—is captured at the rest of the pixel locations with no color filters. Thereafter, the dual RGB and RWB images may be constructed as discussed before, or as shown in the exemplary embodiment of FIG. 12.

It is noted here that a green organic CFA layer like the one discussed earlier with reference to FIGS. 5, and 7-9 also may be added on top of the CFA layer 116 in particular embodiments of the present disclosure to capture additional green color content.

FIG. 12 shows an exemplary CFA layer 122 atop a stacked X3 sensor array 124 and the corresponding ISP-constructed images—a green array 126 and an RWB array 128—as per teachings of particular embodiments of the present disclosure. Like the CFA layer 116 in FIG. 11B, the CFA layer 122 also may include a plurality of red and blue color filters, separated by locations having "clear" filters or no filters, as shown. In one embodiment, the CFA layer 122 may be a non-organic RB filter layer. The stacked X3 sensor array 124 may include a plurality of stacked X3 CMOS sensors, each having a configuration similar to the pixel 104 in FIG. 11A. In one embodiment, the sensor array 124 may contain Foveon X3® sensors as pixels 104. In one embodiment, the pixels in the pixel array 124 may be organized in a square, rectangular, or any other geometrical configuration, and each pixel in the pixel array 124 may have a one-to-one correspondence with a corresponding color filter in the CFA layer 122, as shown. Each individual pixel constituting the pixel array 124 is not shown in FIG. 12 merely for the sake of simplicity of the drawing. As also shown in FIG. 12, the color signals resulting from the filter array 122 atop the pixel array 124 may be processed by the appropriate ISP software—such as, for example, the ISP application 44 shown in FIG. 3—to generate the green color image 126 and the RWB image 128. In the modified X3 sensor 124, the green color may be captured at pixel locations where the R and B filters are absent, whereas the red and blue colors may be captured at corresponding R and B filter locations. The green color may be captured as an output of the green sensor 107 at each respective pixel location. Furthermore, as mentioned before, the white light—representing the combination of all three colors R, G, and B output by respective stacked sensors 106-108—also may be captured at the pixel locations with no color filters. As discussed earlier with reference to FIG. 7, the individual R and B channels may be obtained in the embodiment of FIG. 12 after chromatic denoising and demosaicing on the RWB array 128. The full green (G) channel may be reconstructed from the half-sampled green array 126 by interpolation or demosaicing. As in case of the embodiment in FIG. 7, the white channel resulting from the denoising and demosaicing on the RWB array 128 may be discarded, and the CCM for the remaining R, G, B channels may be used during the color correction phase. This CCM may be an improved version of the earlier-mentioned CCM associated with the traditional stacked sensor array without the CFA layer 122 or other similar CFA layer as per teachings of the present disclosure. The improved CCM in the embodiment of FIG. 12 may therefore minimize the effect of the earlier-discussed cross-talk and reduce noise amplification, thereby facilitating generation of a final image with better quality.

It is noted here that the substantially simultaneous generation of dual RGB-RXB color images during a single imaging operation as per particular embodiments of the present disclosure may reduce color-blindness. A traditional CMOS sensor may be blind to certain color edges because of incomplete sampling of colors. For example, the conventional CMOS RWB sensor is colorblind to red-green edges. On the other hand, the conventional Bayer pattern CMOS RGB sensor is colorblind to green-gray edges. However, when both the RGB as well as RWB images are obtained as discussed before, colorblindness of certain color edges can be avoided by choosing an appropriate alternative image—RGB or RWB—during ISP that is not colorblind to these edges at issue. For example, if the ISP application detects that there is a certain region in the received color content for a captured image where red-green edges exist, the ISP application may be configured to use only the constructed RGB image in the ISP pipeline. On the other hand, if this region contains green-grey edges, then only the RWB image may be used in the ISP pipeline.

Furthermore, chromatic aberration may be reduced by processing the image signals as per teachings of the present disclosure. For example, when chromatic aberration problem cannot be completely eliminated from the lens, a conventional RWB CMOS sensor is known to suffer more from the chromatic aberration than a conventional RGB CMOS sensor. As noted before, chromatic aberration occurs because a non-ideal camera lens may focus lights with various wavelengths at different focal points. Therefore, there will be relative shifts among the red, green, and blue channels. The white light is a mix of lights of all wavelengths. Because each of the R, G, and B wavelengths has its own focal point, when each white pixel in an RWB sensor sums up all of these component color signals, a blurry image is created. The image created by such white pixels is in fact blurrier than that created by pure red, green, or blue pixels.

By switching between RGB and RWB images, which may be constructed as per teachings of the present disclosure, the chromatic aberration issue may be significantly overcome. For example, generally the center of an image has less chromatic aberration than the area farther out. Hence, while processing color content associated with the area closer to the center of the image, the white channel in the RWB image constructed as per teachings of the present disclosure may be used for better de-noising quality. On the other hand, in the area away from the center, the green channel can be used for de-noising because the white channel may produce more blur in that area. Thus, with some trade-off of the signal-to-noise ratio (SNR), sharpness can be gained in the regions close to the boundary of the image.

Additionally, saturation artifacts may be reduced and dynamic range of a CMOS image sensor may be increased, for example, when the multi-layer architecture of FIG. 2 is employed. For example, when such multi-layer architecture is used, the full well capacity (of the photon charge collection region) at each pixel location may be multiplied as compared to the conventional single layer CMOS RWB or RGB sensors. For example, in the 2-layer organic sensor architecture in FIGS. 5 and 7, two photo-sites—one associated with the organic layer 18 and the other one in the pixel array 25 (FIG. 2)—are used to capture the green and the magenta light at one pixel location. Hence, the full well capacity is doubled. As a result, under a bright white light, the white channel in the RWB image constructed as discussed hereinbefore—such as the RWB image 48 in FIG. 7—may be able to capture the correct light intensity instead of being saturated like the conventional single layer RWB sensor. Therefore, the saturation artifacts arising in a conventional RWB sensor due to clipping may be avoided in the multi-layer CMOS sensor as per particular embodiments of the present disclosure. Moreover, a bright yellow light that would otherwise saturate both the white and the red pixels in the conventional RWB sensor may now only saturate the red pixels in the embodiments of FIGS. 7-10 because of the absence of white pixels in the multi-layer CMOS sensors of these embodiments. As discussed before, the RWB image is rather constructed in these embodiments as per teachings of the present disclosure. Because a multi-layer CMOS sensor as per particular embodiments of the present disclosure may capture brighter light without saturation, the dynamic range of the sensor becomes higher than that of a conventional RWB sensor. Hence, YSNR may be increased at full well as compared to conventional RWB sensors.

Figure 13:
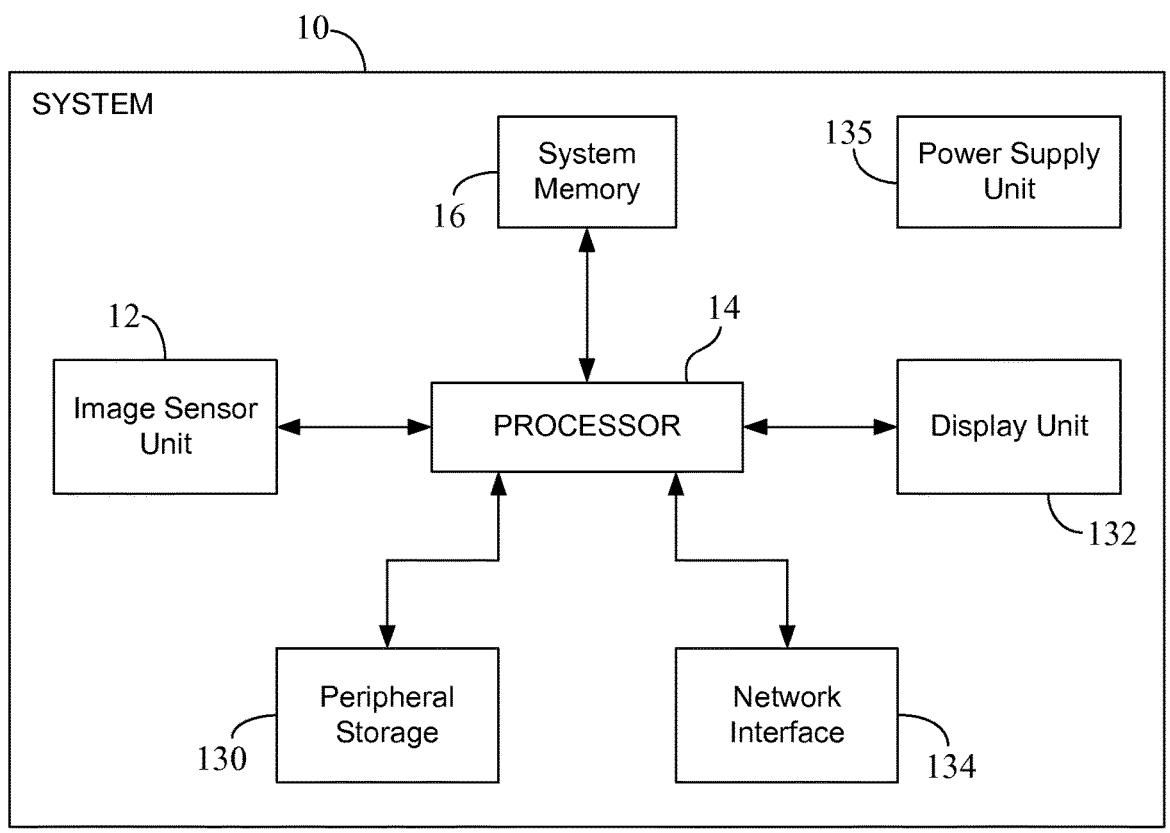
FIG. 13 depicts an overall layout of the system in FIGS. 1-2 according to one embodiment of the present disclosure.

FIG. 13 depicts an overall layout of the system 10 in FIGS. 1-2 according to one embodiment of the present disclosure. Hence, for ease of reference and discussion, the same reference numerals are used in FIGS. 1-2 and 13 for the common system components/units.

As discussed earlier, the image sensor unit 12 may include the CFA hardware shown in the exemplary embodiments of FIGS. 1-3 to support the dual RGB-RXB imaging in a single imaging operation as per the inventive aspects of the present disclosure. In that regard, the image sensor unit 12 may include any of the CFA configurations illustrated in the exemplary embodiments of FIGS. 5, 7-10, 11B, and 12. The processor 14 may be configured to interface with a number of external devices. In one embodiment, the image sensor unit 12 may function as an input device that provides data inputs—in the form of image data such as, for example, the processed data output 75 in FIG. 6—to the processor 14 for further processing. The processor 14 may also receive inputs from other input devices (not shown) that may be part of the system 10. Some examples of such input devices include a computer keyboard, a touchpad, a touch-screen, a joystick, a physical or virtual "clickable button," and/or a computer mouse/pointing device. In FIG. 13, the processor 14 is shown coupled to the system memory 16, a peripheral storage unit 130, one or more output devices 132, and a network interface unit 134. In FIG. 13, a display unit is shown as an output device 132. In some embodiments, the system 10 may include more than one instance of the devices shown. Some examples of the system 10 include a computer system (desktop or laptop), a tablet computer, a mobile device, a cellular phone, a video gaming unit or console, a machine-to-machine (M2M) communication unit, a robot, an automobile, a virtual reality equipment, a stateless "thin" client system, a car's dash-cam or rearview camera system, or any other type of computing or data processing device. In various embodiments, all of the components shown in FIG. 13 may be housed within a single housing. Thus, the system 10 may be configured as a standalone system or in any other suitable form factor. In some embodiments, the system 10 may be configured as a client system rather than a server system.

Exemplary details of the processor 14 are already provided earlier with reference to discussion of FIG. 1 and, hence, such details are not repeated here. In particular embodiments, the system 10 may include more than one processor (e.g., in a distributed processing configuration). When the system 10 is a multiprocessor system, there may be more than one instance of the processor 14 or there may be multiple processors coupled to the processor 14 via their respective interfaces (not shown). The processor 14 may be a System on Chip (SoC) and/or may include more than one Central Processing Units (CPUs).

As mentioned earlier, the system memory 16 may be any semiconductor-based storage system such as, for example, DRAM, SRAM, PRAM, RRAM, CBRAM, MRAM, STT-MRAM, and the like. In some embodiments, the memory unit 16 may include at least one 3DS memory module in conjunction with one or more non-3DS memory modules. The non-3DS memory may include Double Data Rate or Double Data Rate 2, 3, or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 16 may include multiple different types of semiconductor memories, as opposed to a single type of memory. In other embodiments, the system memory 16 may be a non-transitory data storage medium The peripheral storage unit 130, in various embodiments, may include support for magnetic, optical, magneto-optical, or solid-state storage media such as hard drives, flash memories or other semiconductor memories, optical disks (such as Compact Disks (CDs) or Digital Versatile Disks (DVDs)), non-volatile Random Access Memory (RAM) devices, and the like. In some embodiments, the peripheral storage unit 130 may include more complex storage devices/systems such as disk arrays (which may be in a suitable RAID (Redundant Array of Independent Disks) configuration) or Storage Area Networks (SANs), and the peripheral storage unit 130 may be coupled to the processor 14 via a standard peripheral interface such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 132 may be an example of an output device. Other examples of an output device include a graphics/display device, a computer screen, a visual alarm system, a CAD/CAM (Computer Aided Design/Computer Aided Machining) system, a video game station, a smartphone display screen, or any other type of data output device. In some embodiments, the input device(s), such as the image sensor unit 12, and the output device(s), such as the display unit 132, may be coupled to the processor 14 via an I/O or peripheral interface(s).

In one embodiment, the network interface 134 may communicate with the processor 14 to enable the system 10 to couple to a network (not shown). In another embodiment, the network interface 134 may be absent altogether. The network interface 134 may include any suitable devices, media and/or protocol content for connecting the system 10 to a network—whether wired or wireless. In various embodiments, the network may include Local Area Networks (LANs), Wide Area Networks (WANs), wired or wireless Ethernet, telecommunication networks, or other suitable types of networks.

The system 10 may include an on-board power supply unit 135 to provide electrical power to various system components illustrated in FIG. 13. The power supply unit 135 may receive batteries or may be connectable to an AC electrical power outlet. In one embodiment, the power supply unit 135 may convert solar energy into electrical power.

In one embodiment, the image sensor unit 12 may be integrated with a high-speed interface such as, for example, a Universal Serial Bus 2.0 or 3.0 (USB 2.0 or 3.0) interface or above, that plugs into any Personal Computer (PC) or laptop. A non-transitory, computer-readable data storage medium, such as, for example, the system memory 16 or a peripheral data storage unit such as a CD/DVD may store program code or software. In particular embodiments, the software may include the ISP application 44 (FIG. 3) that, upon execution, may provide at least the functionality of the ISP pipeline 63 illustrated in the exemplary embodiment of FIG. 6 as well as the functionality to construct the dual RGB-RXB images as discussed before. The processor 14 and/or the pixel array control unit 37 (FIG. 2) in the image sensor unit 12 may be configured to execute the program code, whereby the device 10 may be operative to perform the various image processing aspects discussed hereinbefore—such as, for example, the generation of dual RGB-RXB images and related image processing operations discussed earlier with reference to FIGS. 1-12. The program code or software may be proprietary software or open source software which, upon execution by the appropriate processing entity—such as the processor 14 and/or the pixel array control unit 37—may enable the processing entity to capture filtered color signals during a single imaging operation, process them to obtain dual RGB-RXB images on the same image sensor chip 12, and render the processed/final image (or video) in a variety of display formats. As noted earlier, in certain embodiments, the pixel array control unit 37 in the image sensor unit 12 may perform at least some of the processing of color signals captured through a camera shot before the partially-processed image signal outputs 75 (FIG. 6) are sent to the processor 14 for further processing and display. In other embodiments, the processor 14 may also perform the functionality of the control unit 37, in which case, the control unit 37 may not be a part of the image sensor unit 12.

In the preceding description, for purposes of explanation and not limitation, specific details are set forth (such as particular architectures, CFA layouts, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Thus, for example, it will be appreciated by those skilled in the art that block diagrams herein (e.g., in FIGS. 1-3, 6, and 13) can represent conceptual views of illustrative circuitry or other functional units embodying the principles of the technology. Similarly, it will be appreciated that the flow chart in FIG. 4 represents various processes which may be substantially performed by a processor (e.g., the processor 14 in FIG. 13 and/or the pixel array control unit 37 in FIG. 2). Such processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the ISP functionalities described above in the context of FIGS. 1-12 also may be provided by such processor, in the hardware and/or software.

When certain inventive aspects require software-based processing, such software or program code may reside in a computer-readable data storage medium. As noted earlier, such data storage medium may be part of the peripheral storage 130, or may be part of the system memory 16, or the processor's 14 or pixel array control unit's 37 internal memory (not shown). In one embodiment, the processor 14 or the control unit 37 may execute instructions stored on such a medium to carry out the software-based processing. The computer-readable data storage medium may be a non-transitory data storage medium containing a computer program, software, firmware, or microcode for execution by a general purpose computer or a processor mentioned above. Examples of computer-readable storage media include a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the image sensor unit 12 or the system 10 comprising such an image sensor unit according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various ISP functionalities discussed herein may be provided through the use of hardware (such as circuit hardware) and/or hardware capable of executing software/firmware in the form of coded instructions or microcode stored on a computer-readable data storage medium (mentioned above). Thus, such functionalities and illustrated functional blocks are to be understood as being either hardware-implemented and/or computer-implemented, and thus machine-implemented.

The foregoing describes a system and method in which improved image processing is used along with a multi-layer CFA architecture to capture both the RGB as well as the RXB images on the same CMOS image sensor chip in a single shot so that subsequent image processing stage(s) can choose between RGB and RXB images to improve the quality of the final image with fewer artifacts at problematic image regions. The color "X" in an RXB image may be a white color, a yellow color, or a cyan color. In contrast to the individual RWB or RGB imaging based conventional CMOS sensors, a CMOS sensor as per particular embodiments of the present disclosure may have multiple layers of CFAs to capture both the RGB and RWB images in a single shot on the same sensor chip. Such a multi-layer sensor may be, for example, an organic sensor or a stacked X3 sensor. By obtaining dual RGB-RXB images (practically simultaneously) and appropriately processing them using the associated ISP, a CMOS sensor according to particular embodiments of the present disclosure can achieve +1 dB YSNR increase over the current RWB sensor and +4 dB YSNR increase over the current RGB sensor.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method comprising:
providing a multi-layer image sensor having a plurality of pixels arranged in a pixel array and further having at least one layer of Color Filer Array (CFA) overlaid on the pixel array such that at least one location-specific color filter is associated with each pixel location in the pixel array;
collecting one or more color signals from each pixel location in the pixel array during a single imaging operation, wherein each color signal associated with a given pixel location represents a different color of light;
for each pixel location, selectively combining only those color signals which are collected from the pixel location so as to obtain a pixel location-specific color content that is independent of color signals collected from neighboring pixel locations in the pixel array; and
using each pixel location-specific color content to construct the following two color patterns, each color pattern having colors arranged in one-to-one correspondence with each pixel location in the pixel array:
a Red-Green-Blue (RGB) color pattern, and
an RXB color pattern, wherein "X" represents one of the following colors: white, yellow, or cyan.

2. The method of claim 1, wherein the multi-layer image sensor is one of the following:
a Complementary Metal Oxide Semiconductor (CMOS) organic sensor; and
a stacked X3 CMOS sensor.

3. The method of claim 1, wherein the at least one layer of CFA includes the following:
a wavelength-selective semi-transparent organic photo-conversion layer; and
a non-organic CFA layer.

4. The method of claim 3, wherein the wavelength-selective semi-transparent organic photo-conversion layer is sensitive to green color only.

5. The method of claim 4, wherein the non-organic CFA layer is one of the following:
a Red-Magenta-Blue (RMB) CFA layer; and
an RB CFA layer.

6. The method of claim 3, wherein the wavelength-selective semi-transparent organic photo-conversion layer is a green light-sensitive Organic Photodiode (OPD).

7. The method of claim 3, wherein the non-organic CFA layer is an RGB CFA layer, and wherein the wavelength-selective organic layer is composed of a plurality of color filters such that at least some color filters in the plurality of color filters are complementary to corresponding color filters in the RGB CFA layer at respective pixel locations in the pixel array.

8. The method of claim 3, wherein providing the multi-layer image sensor includes:
selecting the organic photo-conversion layer sensitive to a first color; and
further selecting the non-organic CFA layer having color filters in a plurality of second colors, wherein at least one color in the plurality of second colors is selected such that a color signal having the selected second color, when combined with a color signal having the first color, produces the color "X" in the RXB color pattern.

9. The method of claim 1, wherein at least one of the following applies:
color filters in at least one CFA layer are arranged in a Bayer pattern;
colors in the RGB color pattern are arranged in the Bayer pattern; and
colors in the RXB color pattern are arranged in the Bayer pattern.

10. The method of claim 1, wherein selectively combining the color signals includes:
selectively combining the color signals using software.

11. The method of claim 1, wherein selectively combining the color signals includes one of the following:
combining the color signals from less than all pixel locations in the pixel array to construct the RGB and the RXB color patterns; and
combining the color signals only as needed to construct the RGB and RXB color patterns.

12. The method of claim 1, further comprising:
performing the following as part of generating an image for a user as a result of the single imaging operation:
performing chromatic denoising using color content from the RXB color pattern only, and
performing color correction using a Color Correction Matrix (CCM) associated with the RGB color pattern only.

13. The method of claim 12, further comprising:
performing at least one of the following:
using color content from only the RGB color pattern to generate a first region in the image where red-green edges are present;
using color content from only the RXB color pattern to generate a second region in the image where green-grey edges are present;

using color content from only the RXB color pattern to generate image content closer to a center of the image; and using color content from only the RGB color pattern to generate image content away from the center of the image.

14. A method comprising:

providing a multi-layer image sensor having a plurality of pixels arranged in a pixel array and further having at least one layer of Color Filer Array (CFA) overlaid on the pixel array such that at least one location-specific color filter is associated with each pixel location in the pixel array, wherein the at least one layer of CFA includes the following:
- a wavelength-selective semi-transparent organic photo-conversion layer, and
- a non-organic CFA layer;

collecting one or more color signals from each pixel location in the pixel array during a single imaging operation, wherein each color signal associated with a given pixel location represents a different color of light; and selectively combining color signals from each pixel location to construct the following color patterns, each color pattern having colors arranged in one-to-one correspondence with each pixel location in the pixel array:
- a Red-Green-Blue (RGB) color pattern, and
- an RXB color pattern, wherein "X" represents one of the following colors: white, yellow, or cyan, wherein the organic photo-conversion layer is sensitive to a first color and the non-organic CFA layer has color filters in a plurality of second colors, and wherein at least one color in the plurality of second colors is selected such that a color signal having the selected second color, when combined with a color signal having the first color, produces the color "X" in the RXB color pattern.

15. The method of claim 14, wherein the multi-layer image sensor is one of the following:
- a Complementary Metal Oxide Semiconductor (CMOS) organic sensor; and
- a stacked X3 CMOS sensor.

16. The method of claim 14, wherein the wavelength-selective semi-transparent organic photo-conversion layer is sensitive to green color only.

17. The method of claim 14, wherein the non-organic CFA layer is an RGB CFA layer, and wherein the wavelength-selective organic layer is composed of a plurality of color filters such that at least some color filters in the plurality of color filters are complementary to corresponding color filters in the RGB CFA layer at respective pixel locations in the pixel array.

18. The method of claim 14, further comprising:

performing at least one of the following as part of generating an image for a user as a result of the single imaging operation:
- using color content from only the RGB color pattern to generate a first region in the image where red-green edges are present;
- using color content from only the RXB color pattern to generate a second region in the image where green-grey edges are present;
- using color content from only the RXB color pattern to generate image content closer to a center of the image; and
- using color content from only the RGB color pattern to generate image content away from the center of the image.

19. A method comprising:

providing a multi-layer image sensor having a plurality of pixels arranged in a pixel array and further having at least one layer of Color Filer Array (CFA) overlaid on the pixel array such that at least one location-specific color filter is associated with each pixel location in the pixel array;

collecting one or more color signals from each pixel location in the pixel array during a single imaging operation, wherein each color signal associated with a given pixel location represents a different color of light;

selectively combining color signals from each pixel location to construct the following color patterns, each color pattern having colors arranged in one-to-one correspondence with each pixel location in the pixel array:
- a Red-Green-Blue (RGB) color pattern, and
- an RXB color pattern, wherein "X" represents one of the following colors: white, yellow, or cyan;

performing the following as part of generating an image for a user as a result of the single imaging operation:
- performing chromatic denoising using color content from the RXB color pattern only, and
- performing color correction using a Color Correction Matrix (CCM) associated with the RGB color pattern only; and further performing at least one of the following:
- using color content from only the RGB color pattern to generate a first region in the image where red-green edges are present,
- using color content from only the RXB color pattern to generate a second region in the image where green-grey edges are present,
- using color content from only the RXB color pattern to generate image content closer to a center of the image, and
- using color content from only the RGB color pattern to generate image content away from the center of the image.

20. The method of claim 19, wherein the at least one layer of CFA includes the following:
- a wavelength-selective semi-transparent organic photo-conversion layer, and
- a non-organic CFA layer, and wherein providing the multi-layer image sensor includes:
- selecting the organic photo-conversion layer sensitive to a first color; and
- further selecting the non-organic CFA layer having color filters in a plurality of second colors, wherein at least one color in the plurality of second colors is selected such that a color signal having the selected second color, when combined with a color signal having the first color, produces the color "X" in the RXB color pattern.

* * * * *